IMAGE

United States Patent
Shimada et al.

(10) Patent No.: US 12,431,609 B2
(45) Date of Patent: Sep. 30, 2025

(54) RFID TAG AND MANUFACTURING METHOD THEREOF

(71) Applicant: DAIO PAPER CORPORATION, Ehime (JP)

(72) Inventors: Takuro Shimada, Ehime (JP); Alina Kan, Ehime (JP)

(73) Assignee: Daio Paper Corporation, Ehime (JP)

( * ) Notice: Subject to any disclaimer, the term of this patent is extended or adjusted under 35 U.S.C. 154(b) by 219 days.

(21) Appl. No.: 18/250,078

(22) PCT Filed: Dec. 13, 2021

(86) PCT No.: PCT/JP2021/045844
§ 371 (c)(1),
(2) Date: Apr. 21, 2023

(87) PCT Pub. No.: WO2022/131215
PCT Pub. Date: Jun. 23, 2022

(65) Prior Publication Data
US 2023/0395966 A1 Dec. 7, 2023

(30) Foreign Application Priority Data
Dec. 17, 2020 (JP) .................. 2020-209378

(51) Int. Cl.
*H01Q 1/22* (2006.01)
*G06K 19/077* (2006.01)
*H01Q 9/28* (2006.01)

(52) U.S. Cl.
CPC ..... *H01Q 1/2225* (2013.01); *G06K 19/07749* (2013.01); *G06K 19/07773* (2013.01);
(Continued)

(58) Field of Classification Search
CPC ...... H01Q 1/22; H01Q 1/2208; H01Q 1/2216; H01Q 1/2225; H01Q 9/16; H01Q 9/24;
(Continued)

(56) References Cited

U.S. PATENT DOCUMENTS

2006/0044769 A1 3/2006 Forster et al.
2009/0079542 A1 3/2009 Heinl
(Continued)

FOREIGN PATENT DOCUMENTS

CA 3106870 A1 1/2020
CN 101743666 B 6/2010
(Continued)

OTHER PUBLICATIONS

International Search Report for PCT/JP2021/045844, dated Mar. 1, 2022.
(Continued)

*Primary Examiner* — Robert Karacsony
(74) *Attorney, Agent, or Firm* — Andrus Intellectual Property Law, LLP

(57) ABSTRACT

An RFID tag including an inlay that is thin and easy to manufacture. The above problem is solved by an RFID tag including an inlay in which an IC chip and an antenna are provided on a base material having a main surface, wherein the antenna includes a loop conductive portion having both end portions connected to the IC chip so as to form a loop shape through the IC chip, and a dipole antenna portion disposed to surround the loop conductive portion with an interval allowing inductive coupling, and the loop conductive portion and the dipole antenna portion are formed on the main surface to have same thickness based on the main surface, and the IC chip is disposed on both end portions of the loop conductive portion.

16 Claims, 25 Drawing Sheets

(52) U.S. Cl.
CPC . *G06K 19/07786* (2013.01); *G06K 19/07794* (2013.01); *H01Q 9/285* (2013.01); *G06K 19/07756* (2013.01)

(58) Field of Classification Search
CPC .......... H01Q 9/26; H01Q 9/265; H01Q 9/285; G06K 19/077; G06K 19/0772; G06K 19/07722; G06K 19/07749; G06K 19/0775; G06K 19/07752; G06K 19/07754; G06K 19/07756; G06K 19/07758; G06K 19/0776; G06K 19/07762; G06K 19/07764; G06K 19/07767; G06K 19/07773; G06K 19/07777; G06K 19/07786; G06K 19/0779; G06K 19/07794
See application file for complete search history.

(56) References Cited

U.S. PATENT DOCUMENTS

| | | | |
|---|---|---|---|
| 2010/0097191 A1* | 4/2010 | Yamagajo | H01Q 1/36 340/10.1 |
| 2011/0168788 A1 | 7/2011 | Sonoda et al. | |
| 2015/0108221 A1* | 4/2015 | Akamatsu | H01Q 1/2225 235/488 |
| 2015/0161919 A1 | 6/2015 | Lim et al. | |
| 2017/0162952 A1 | 6/2017 | Zeng | |

FOREIGN PATENT DOCUMENTS

| | | |
|---|---|---|
| CN | 102112998 A | 6/2011 |
| CN | 110140132 A | 8/2019 |
| EP | 3736738 A1 | 11/2020 |
| JP | 2006285911 A | 10/2006 |
| JP | 2008107947 A | 5/2008 |
| JP | WO2009011041 A1 | 9/2010 |
| JP | 2015525901 A | 9/2015 |
| TW | 201405430 A | 2/2014 |
| WO | 2010013810 A1 | 2/2010 |
| WO | 2020020530 A1 | 1/2020 |

OTHER PUBLICATIONS

Extended European Search Report for European Patent Application No. 21906577.8, dated Oct. 10, 2024.

Office Action for TW Patent Appl. No. 110145829, dated Mar. 21, 2025.

* cited by examiner (a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(a)

(b)

(a)

(b)

(a)

(b)

RFID TAG AND MANUFACTURING METHOD THEREOF

CROSS-REFERENCE TO RELATED APPLICATIONS

This application is the U.S. national stage application of International Application PCT/JP2021/045844, filed Dec. 13, 2021, which international application was published on Jun. 23, 2022, as International Publication WO 2022/131215 in the Japanese language. The International Application claims priority of Japanese Patent Application No. 2020-209378, filed Dec. 17, 2020. The international application and Japanese application are both incorporated herein by reference, in entirety.

TECHNICAL FIELD

The present invention relates to an RFID tag incorporating an inlay and a manufacturing method thereof.

BACKGROUND ART

As is well known, an RFID tag (also referred to as an electronic tag, an IC tag, etc.) has an IC chip and an antenna connected thereto in order to store and read information without contact by short-range wireless communication. RFID (Radio frequency identification) is an automatic recognition system that uses such an RFID tag to write individual information of an object to the RFID tag and read individual information of an object stored in the RFID tag through wireless communication, and has been widely used for billing, prepaid, security management, article and logistics management, etc.

Various types of RFID tags have been known, such as a card type, a label type (including both a seal type having a pressure sensitive adhesive layer on a back surface and a type having no pressure sensitive adhesive layer), and a wristband type. Of these types, some RFID tags such as label-type tags generally incorporate an inlay (inlet) in which a conductive portion including an antenna is formed on a resin film and an IC chip is disposed on this conductive portion.

As an RFID tag incorporating such an inlay, for example, one described in Patent Literature 1 has been known.

However, in the RFID tag described in Patent Literature 1, since an antenna is not formed in the inlay, and the RFID tag is configured by stacking the inlay on an antenna portion formed separately from the inlay, there have been problems in that manufacturing efficiency is low, and the thickness of the whole including the antenna could not be suppressed. Since the thickness of the inlay affects the thickness of the RFID tag, a thinner one is preferable.

CITATION LIST

Patent Literature

Patent Literature 1: JP 2008-107947 A

SUMMARY OF INVENTION

Technical Problem

Accordingly, it is a primary object of the present invention to provide an RFID tag including an inlay that is thin and easy to manufacture.

Solution to Problem

An RFID tag that solves the above problem is as follows.

First Aspect

An RFID tag including
a base material having a main surface; and
an inlay provided with an IC chip and an antenna on the base material, wherein
the antenna includes a loop conductive portion having both end portions connected to the IC chip so as to form a loop shape through the IC chip, and a dipole antenna portion disposed to surround the loop conductive portion with an interval allowing inductive coupling, and
the loop conductive portion and the dipole antenna portion are formed on the main surface to have same thickness based on the main surface, and the IC chip is disposed on both end portions of the loop conductive portion.

Effect

According to the RFID tag, the loop conductive portion and the dipole antenna portion can be easily formed in one process, so that the thickness of the inlay can be suppressed when compared to that described in Patent Literature 1 while improving the manufacturing efficiency, and thus the thickness of the RFID tag can be suppressed.

Second Aspect

An RFID tag including
a base material having a main surface; and
an inlay provided with an IC chip and an antenna on the base material, wherein
the antenna includes a loop conductive portion having both end portions connected to the IC chip so as to form a loop shape through the IC chip, and a dipole antenna portion disposed to surround the loop conductive portion with an interval,
the loop conductive portion extends through the IC chip so as to have a relatively short first axis of symmetry and a relatively long second axis of symmetry orthogonal thereto,
the dipole antenna portion forms a shape having an axis of symmetry overlapping the first axis of symmetry,
the IC chip is disposed at one end portion of the first axis of symmetry,
a single connection conductive portion is provided to connect the other end portion of the first axis of symmetry of the loop conductive portion and the dipole antenna portion to each other, and
the loop conductive portion, the connection conductive portion, and the dipole antenna portion are formed on the main surface so as to have same thickness based on the main surface, and the IC chip is disposed at both end portions of the loop conductive portion.

Effect

According to the RFID tag, the loop conductive portion and the dipole antenna portion can be easily formed in one process, so that the thickness of the inlay can be suppressed when compared to that described in Patent Literature 1 while improving the manufacturing efficiency, and thus the thickness of the RFID tag can be suppressed.

Third Aspect

The RFID tag according to the first or second aspect, wherein
- the dipole antenna portion is disposed to surround the loop conductive portion at a certain interval,
- the loop conductive portion extends through the IC chip to form an oval shape or a substantially rectangular shape having a relatively short first axis of symmetry and a relatively long second axis of symmetry orthogonal thereto,
- the IC chip is disposed at one end portion of the first axis of symmetry, and
- the dipole antenna portion has an axis of symmetry overlapping the first axis of symmetry, has a pair of tip edges facing and spaced apart from each other with a virtual line obtained by extending an IC chip side of the first axis of symmetry interposed therebetween, and continues so as to wrap around the loop conductive portion from one side to the other side of each of the tip edges.

Effect

In an RFID tag, it is preferable that the antenna is in a wide bandwidth since an influence of shift of a frequency band due to a surrounding environment, etc. is reduced. By adopting the shape and arrangement of the dipole antenna portion and arrangement of the IC chip of this aspect, it is possible to widen a bandwidth of the antenna while suppressing a decrease in communication distance. Even though a reason therefor is not clear, one reason is considered that the dipole antenna portion is evenly inductively coupled with the loop conductive portion entirely in a circumferential direction.

Fourth Aspect

The RFID tag according to the third aspect, wherein
- the dipole antenna portion has an inner peripheral edge continuous along an outer peripheral edge of the loop conductive portion, outer peripheral edges, and the pair of tip edges connecting both ends of the inner peripheral edge and both ends of each of the outer peripheral edges,
- the outer peripheral edges have a pair of first edge portions extending parallel to the first axis of symmetry, a second edge portion extending parallel to the second axis of symmetry and connecting one end of one of the first edge portions and one end of the other one of the first edge portions, and a third edge portion connecting ends of the pair of tip edges on an opposite side from a second edge portion side and the other end of each of the first edge portions, and
- a sum of a dimension of the pair of first edge portions in a direction along the first axis of symmetry, a dimension of the second edge portion in a direction along the second axis of symmetry, and a dimension of the pair of tip edges in the direction along the first axis of symmetry is equal to ½ wavelength of a used frequency.

Effect

As will be apparent from embodiments to be described later, it is preferable in terms of widening the bandwidth of the antenna when the dimensions and shapes of the respective portions are within the ranges of this aspect.

Fifth Aspect

The RFID tag according to the fourth aspect, wherein the used frequency is in a UHF band.

Effect

In general, in an RFID, four types of used frequency bands are used, namely an LF band, an HF band, a UHF band, and a microwave band. Of these types, the UHF band (860 to 960 MHz), which is the used frequency of the fifth aspect, has a high frequency and a short wavelength, which is advantageous for miniaturizing antennas. On the other hand, depending on the shape of the antenna, it may be difficult to achieve both miniaturization and performance, or easiness of manufacture may be impaired. On the other hand, adopting the antenna shape of the third aspect described above as in this fifth aspect is preferable since the antenna shape is not only simple and easy to manufacture, but also can achieve both miniaturization and performance.

Sixth Aspect

The RFID tag according to any one of the third to fifth aspects, wherein the RFID tag is an RFID label having a pressure sensitive adhesive layer on a back surface.

Effect

The bandwidth of the antenna of the RFID label affixed to an article by the pressure sensitive adhesive layer on the back side shifts due to an influence of a dielectric constant of the article to be affixed. Therefore, in an article affixing-type RFID tag, when the shape of the dipole antenna of the second aspect is adopted to widen the bandwidth, even if the bandwidth of the antenna shifts somewhat, the used frequency rarely deviates from the antenna bandwidth, and communication performance such as a communication distance is less likely to deteriorate, which is preferable.

Seventh Aspect

The RFID tag according to any one of the first to sixth aspects, wherein the loop conductive portion has a dimension at which a resonance circuit configured together with the IC chip is tuned to a used frequency.

Effect

When the loop conductive portion has the dimension of this aspect, by staggered tuning of a resonance circuit including the IC chip and the loop conductive portion and a resonance circuit including the IC chip, the loop conductive portion, and the dipole antenna portion, it is possible to widen the bandwidth of the antenna, which is preferable.

Eighth Aspect

A method of manufacturing the RFID tag according to the first aspect, the method including
- forming the loop conductive portion and the dipole antenna portion on the base material by etching or printing, and
- mounting the IC chip on the loop conductive portion.

Effect

The same effects as those of the first aspect are obtained.

Advantageous Effects of Invention

The present invention provides an advantage such as an RFID tag including an inlay that is thin and easy to manufacture.

DESCRIPTION OF EMBODIMENTS

Figure 1:
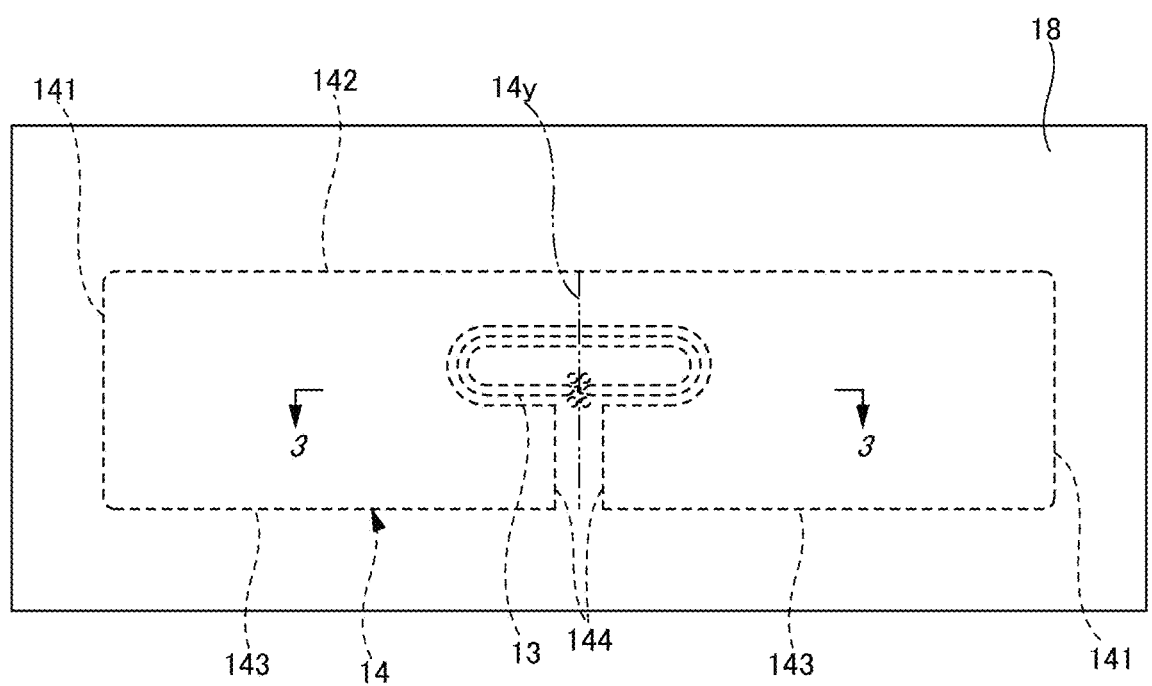
FIG. 1 is a front view illustrating an example of an RFID tag.
Figure 2:
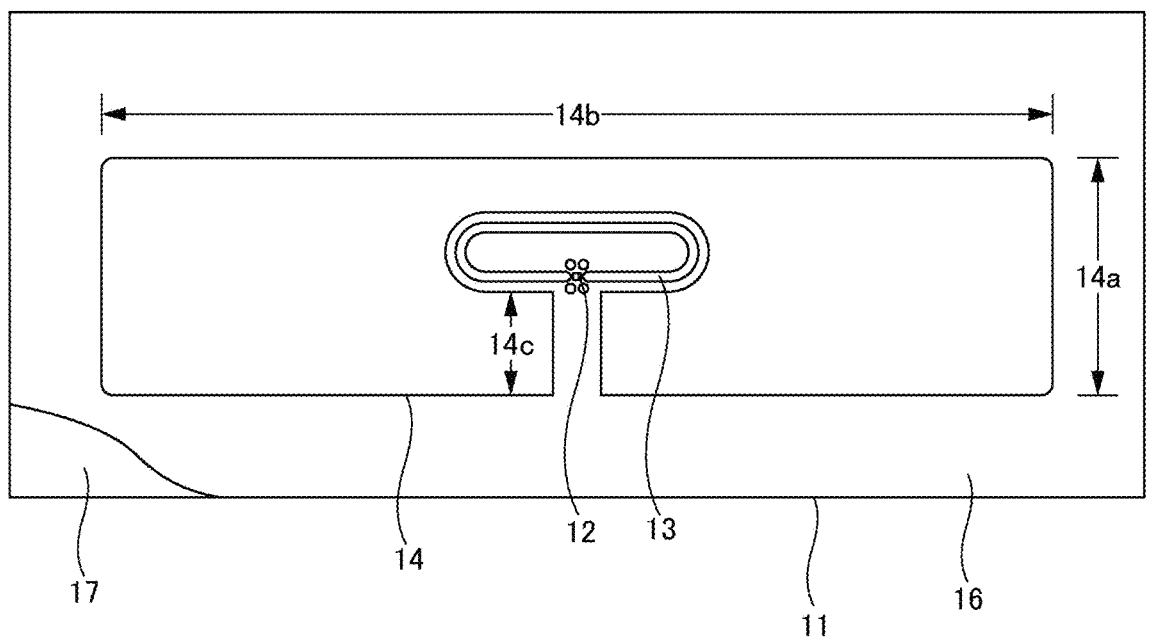
FIG. 2 is a back view illustrating the example of the RFID tag.
Figure 3:
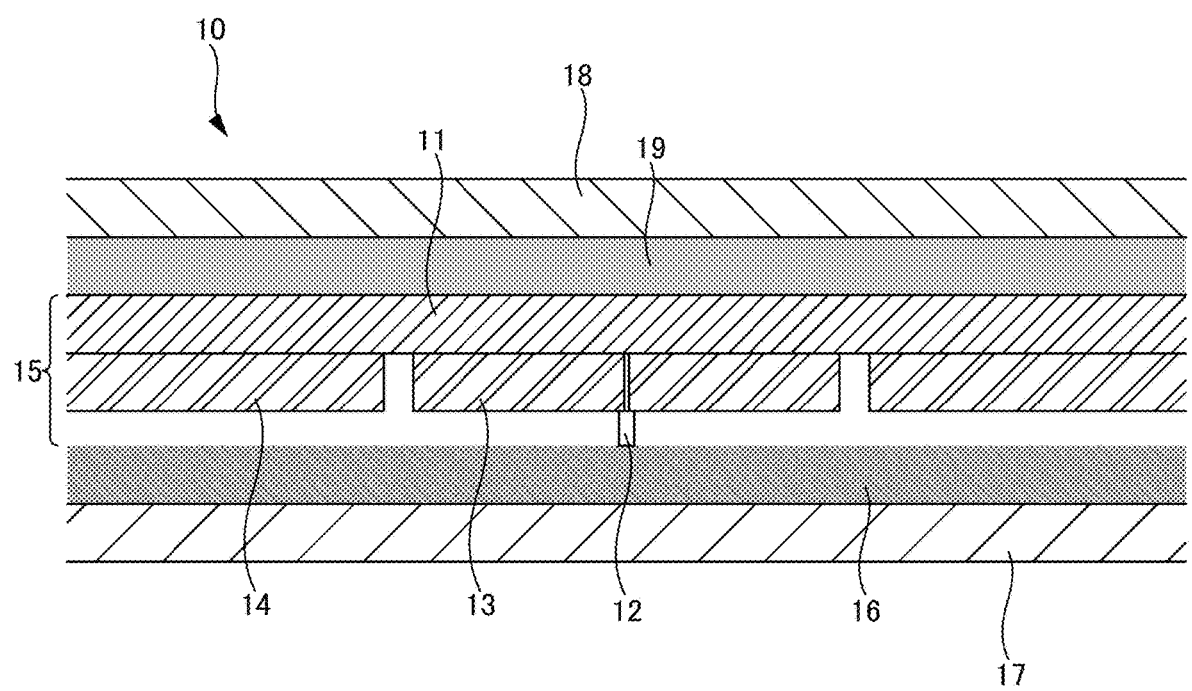
FIG. 3 is a cross-sectional view taken along 3-3 of FIG. 1.

An example of an RFID tag 10 will be described in detail below with reference to the accompanying drawings. As illustrated in FIGS. 1 to 3, the RFID tag 10 of this example includes an inlay 15 in which an IC chip 12 and conductive portions 13 and 14 forming an antenna are provided in a base material 11 having a sheet shape, etc. Dimensions and shape of the inlay 15 may be the same as those of the RFID tag 10 or may be different from (for example, smaller than) the RFID tag 10. Since an example illustrated in FIG. 2 is a seal label-type RFID using the base material 11 made of resin, a pressure sensitive adhesive layer 16 is provided on a back surface side of the base material 11 so as to cover the conductive portions 13 and 14 forming the antenna and the IC chip 12, and a peel sheet 17 is provided to cover the pressure sensitive adhesive layer 16. By peeling off the peel sheet 17 and exposing the pressure sensitive adhesive layer 16 on the back surface, the RFID tag 10 can be affixed to an adherend such as a PET bottle. Meanwhile, a front surface side of the base material 11 is covered with a paper layer 18 as a printing portion. The paper layer 18 is attached to a surface of the base material 11 via an adhesive layer 19.

Figure 4:
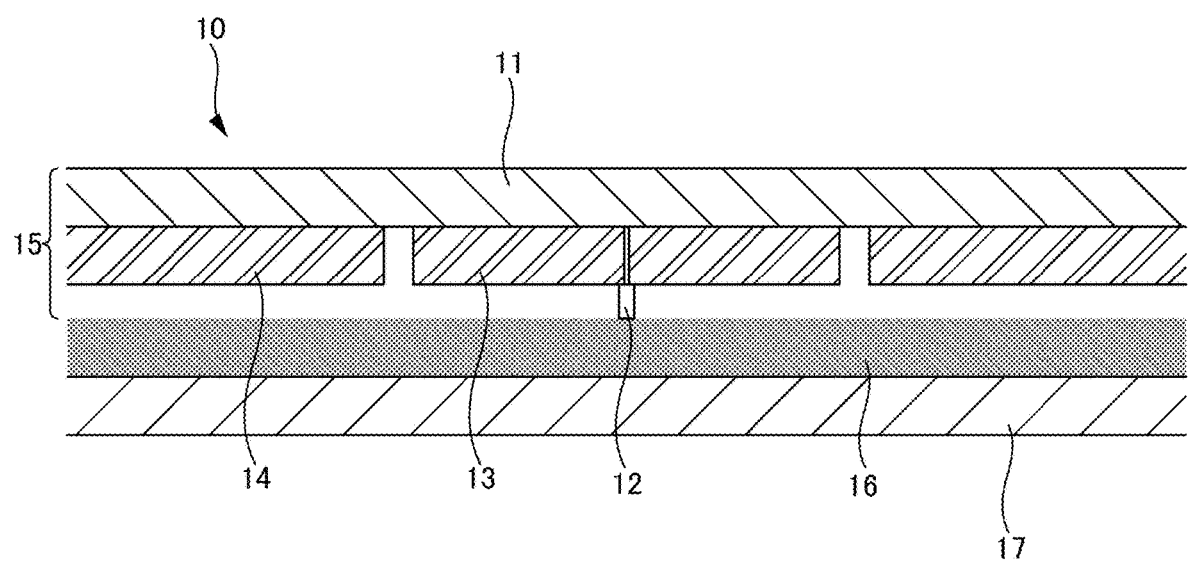
FIG. 4 is a cross-sectional view corresponding to a cross section 3-3 of FIG. 1.

In FIG. 4, the base material 11 is a paper layer that also serves as a printing portion, and the number of portions required is smaller than that illustrated in FIG. 3.

A material of the base material 11 of the inlay 15 is not particularly limited. However, it is possible to use synthetic resin such as polyethylene terephthalate, polyvinyl chloride, polyester, polyethylene, or polypropylene, and it is also possible to use paper such as high-quality paper, medium-quality paper, coated paper, art paper, or kraft paper. A thickness of the sheet-shaped base material 11 can be determined as appropriate, and is usually preferably set to 25 to 50 μm. The base material 11 has dimensions that allow mounting of components (the IC chip 12, the conductive portions 13 and 14, etc.). When the base material 11 is transparent or translucent, a back view appears symmetrically with a front view, and when the base material 11 is opacity, components such as the IC chip 12 and the conductive portions 13 and 14 do not appear in the back view.

The conductive portions 13 and 14 functioning as in the antenna can be formed in an appropriate form such as a layer shape on the back surface (or a front surface) of the base material 11 by a known method. For example, the conductive portions 13 and 14 can be formed by forming a metal layer on the back surface of the base material 11 using plating, vapor deposition, dry lamination, etc., printing a resist pattern on the metal layer, and then performing chemical etching. Alternatively, the conductive portions 13 and 14 can be formed by printing conductive ink containing metal particles or carbon on the base material 11. A thickness of the conductive portions 13 and 14 can be determined as appropriate, and is usually preferably set to 10 to 30 μm.

As can be seen from the above description, depending on the form of the RFID tag 10, a material of the conductive portions 13 and 14, a part added to a portion other than the inlay 15, etc. change.

(Conductive Portion)

The antenna of the RFID tag 10 of this example includes a loop conductive portion 13 having both end portions connected to the IC chip 12 so as to form a loop shape through the IC chip 12, and a dipole antenna portion 14 disposed to surround the loop conductive portion 13 with an interval allowing inductive coupling, the loop conductive portion 13 and the dipole antenna portion 14 are formed on the back surface (or the front surface) of the base material 11 so as to have a common thickness, and the IC chip 12 is disposed on both end portions of the loop conductive portion 13. As a result, the loop conductive portion 13 and the dipole antenna portion 14 can be easily formed in one process, so that the thickness of the inlay 15 can be suppressed while improving the manufacturing efficiency, and thus the thickness of the RFID tag 10 can be suppressed.

Figure 5:
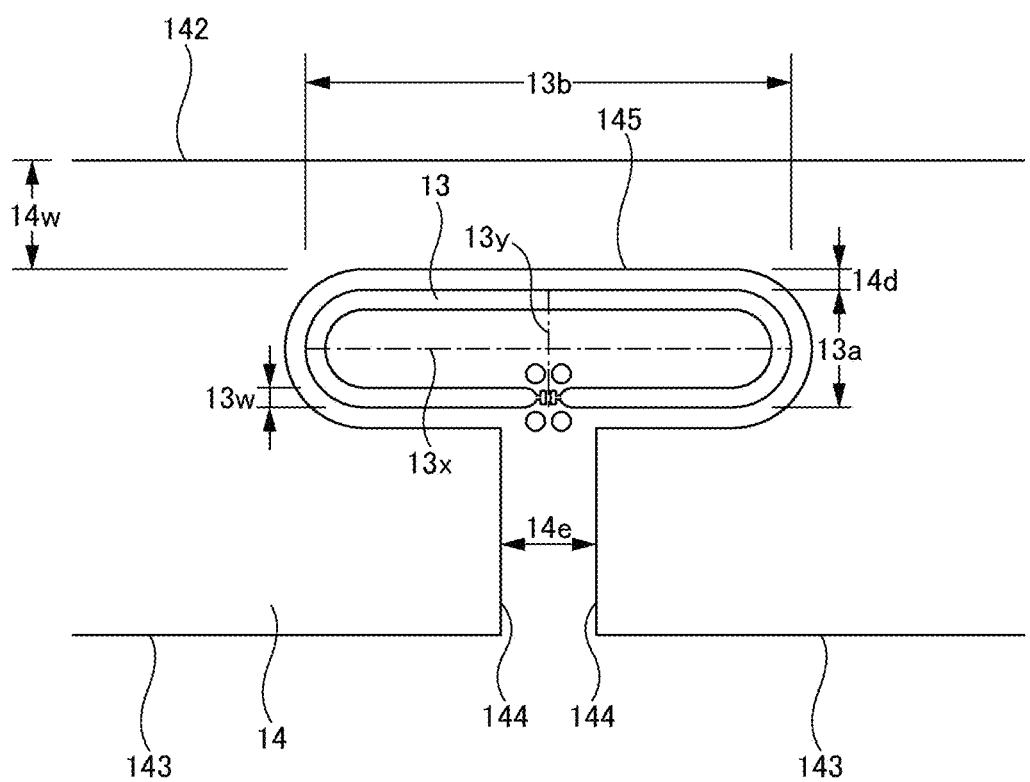
FIG. 5 is a plan view illustrating an enlarged main part of a loop conductive portion/dipole antenna portion.
Figure 6:
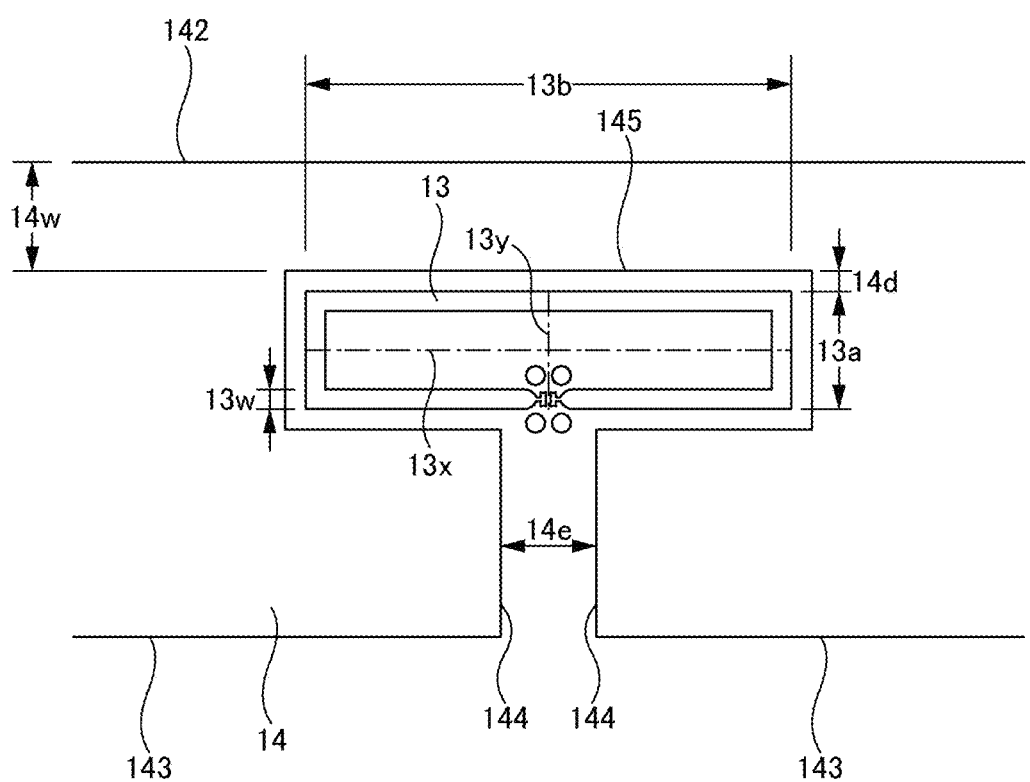
FIG. 6 is a plan view illustrating an enlarged main part of the loop conductive portion/dipole antenna portion.

A shape of the loop conductive portion 13 can be determined as appropriate. However, as in the illustrated example, it is preferable to adopt a shape having a relatively short first axis of symmetry 13y and a relatively long second axis of symmetry 13x orthogonal thereto, and it is particularly preferable to adopt an oval shape (see FIG. 5, etc.) or a substantially rectangular shape (see FIG. 6). Note that the oval shape includes both a shape having one or a plurality of straight line parts (a shape having a pair of parallel straight line parts having the same length and semicircular parts connecting both ends of these straight light parts in the illustrated example) and a shape not including a straight line part such as an ellipse. Further, the substantially rectangular shape includes not only a shape having right-angled corners as illustrated in FIG. 6, but also a rounded rectangle having mostly straight four sides and quarter-circular corners.

A position of the IC chip 12 can be determined as appropriate. However, as in the illustrated example, the IC chip 12 is preferably disposed at one end portion of the first axis of symmetry 13y when the loop conductive portion 13 has the relatively short first axis of symmetry 13y and the relatively long second axis of symmetry 13x orthogonal thereto.

An interval 14d between the dipole antenna portion 14 and the loop conductive portion 13 can be determined as appropriate. However, as in the illustrated example, it is preferable that the dipole antenna portion 14 is disposed almost entirely so as to surround the loop conductive portion 13 at the certain interval 14d. This interval 14d depends on the dimensions of the loop conductive portion 13, and can be normally set to about 0.5 to 1.5 mm.

In addition, a shape of the dipole antenna portion 14 can be determined as appropriate. However, as in the illustrated example, when the loop conductive portion 13 has the relatively short first axis of symmetry 13y and the relatively long second axis of symmetry 13x orthogonal thereto, it is preferable that the dipole antenna portion 14 has an axis of symmetry overlapping the first axis of symmetry 13y, has a pair of tip edges 144 facing each other at an interval with a virtual line obtained by extending the IC chip 12 side of the first axis of symmetry 13y interposed therebetween, and continues in a substantially C-shape so as to wrap around the loop conductive portion 13 from one side to the other side of each of the tip edges 144. An interval 14e between the pair of tip edges 144 in a direction along the second axis of symmetry 13x can be determined as appropriate, and can be normally set to about 1 to 7 mm. Outer peripheral edges 141 to 143 of the dipole antenna portion 14 may be formed parallel to an inner peripheral edge 145 of the dipole antenna portion 14, or may be formed along (particularly parallel to) an outer peripheral shape (for example, rectangle) of the inlay 15 regardless of the inner peripheral edge 145 of the dipole antenna portion 14.

By adopting the shape and arrangement of the dipole antenna portion 14 and arrangement of the IC chip 12 described above, it is possible to widen a bandwidth of the antenna while suppressing a decrease in communication distance. Even though a reason therefor is not clear, one reason is considered that the dipole antenna portion 14 is evenly inductively coupled with the loop conductive portion 13 entirely in a circumferential direction.

Since the loop conductive portion 13 has inductance and resistance, the dimensions of each portion (a loop area, a circumference length, a line width 13w, etc.) can be appropriately determined according to the required inductance and resistance of the loop conductive portion 13. The inductance of the loop conductive portion 13 can be used to compensate for lack of a reactance component in impedance matching between the IC and the dipole antenna portion 14. In addition, the inductance of the loop conductive portion 13 can be used to tune a resonance circuit configured together with the IC chip 12 to a used frequency. In this case, by staggered tuning of a resonance circuit including the IC chip 12 and the loop conductive portion 13 and a resonance circuit including the IC chip 12, the loop conductive portion 13, and the dipole antenna portion 14, it is possible to widen the bandwidth of the antenna (widen the bandwidth to a low frequency side by increasing the circumference length of the loop conductive portion 13). As an example, when the used frequency is in a UHF band, the loop area (area inside the loop) of the loop conductive portion 13 can be about 60 to 110 mm$^2$. Further, an inner circumference length of a loop of the loop conductive portion 13 can be set to about 45 to 55 mm. Furthermore, the line width 13w of the loop conductive portion 13 can be set to about 0.5 to 3.0 mm.

Dimensions of each portion of the dipole antenna portion 14 can be appropriately determined based on ½ wavelength of the used frequency. For example, the dipole antenna portion 14 in the illustrated example has the outer peripheral edges 141 to 143, the inner peripheral edge 145 continuous along an outer peripheral edge of the loop conductive portion 13, and the pair of tip edges 144 connecting both ends of the inner peripheral edge 145 and both ends of each of the outer peripheral edges 141 to 143, and the outer peripheral edges 141 to 143 have a pair of first edge portions 141 extending parallel to the first axis of symmetry 13y, a second edge portion 142 extending parallel to the second axis of symmetry 13x and connecting one end of one of the first edge portions 141 and one end of the other one of the first edge portions 141, and a third edge portion 143 connecting ends of the pair of tip edges 144 on the opposite side from the second edge portion 142 side and the other end of each of the first edge portions 141. In this case, when a sum of a dimension 14a of the pair of first edge portions 141 in a direction along the first axis of symmetry 13y, a dimension 14b of the second edge portion 142 in a direction along the second axis of symmetry 13x, and a dimension 14c of the pair of tip edges 144 in the direction along the first axis of symmetry 13y is equal to ½ wavelength of the used frequency, it is preferable for widening the bandwidth of the antenna.

The RFID tag 10 of this example can be applied to any of four types of commonly used frequency bands, namely an LF band, an HF band, a UHF band, and a microwave band. Of these types, the UHF band (860 to 960 MHz) has a high frequency and a short wavelength, which is advantageous for miniaturizing antennas. On the other hand, depending on the shape of the antenna, it may be difficult to achieve both miniaturization and performance, or easiness of manufacture may be impaired. Therefore, the dimensions, arrangement, and shape of the dipole antenna portion 14 and the loop conductive portion 13 in the wide bandwidth described above are particularly suitable for use in the UHF band. When the dipole antenna portion 14 in the illustrated example is used in the UHF band, for example, it is preferable that a length of the pair of first edge portions 141 is set to about 20 to 27 mm, a length of the second edge portion 142 is set to about 91 to 97 mm, and a length of each of the pair of tip edges 144 is set to about 7.5 to 13.5 mm. In addition, a minimum width 14w of the dipole antenna portion 14 can be set to about 2.5 to 8.5 mm.

The RFID tag 10 may be in a form other than the seal label type of this example, and the dimensions, arrangement, and shape of the dipole antenna portion 14 and the loop conductive portion 13 of this example can be applied to a form other than the seal label type. However, since the bandwidth of the antenna of the seal label-type RFID tag shifts due to an influence of a dielectric constant of an object to be affixed, when the dimensions and arrangement of the dipole antenna portion 14 and the loop conductive portion 13 in the wide bandwidth described above are adopted to broaden the bandwidth, even if the bandwidth of the antenna shifts to some extent, the used frequency is less likely to deviate from the antenna bandwidth, and communication performance such as communication distance is less likely to deteriorate, which is preferable.

Figure 7:
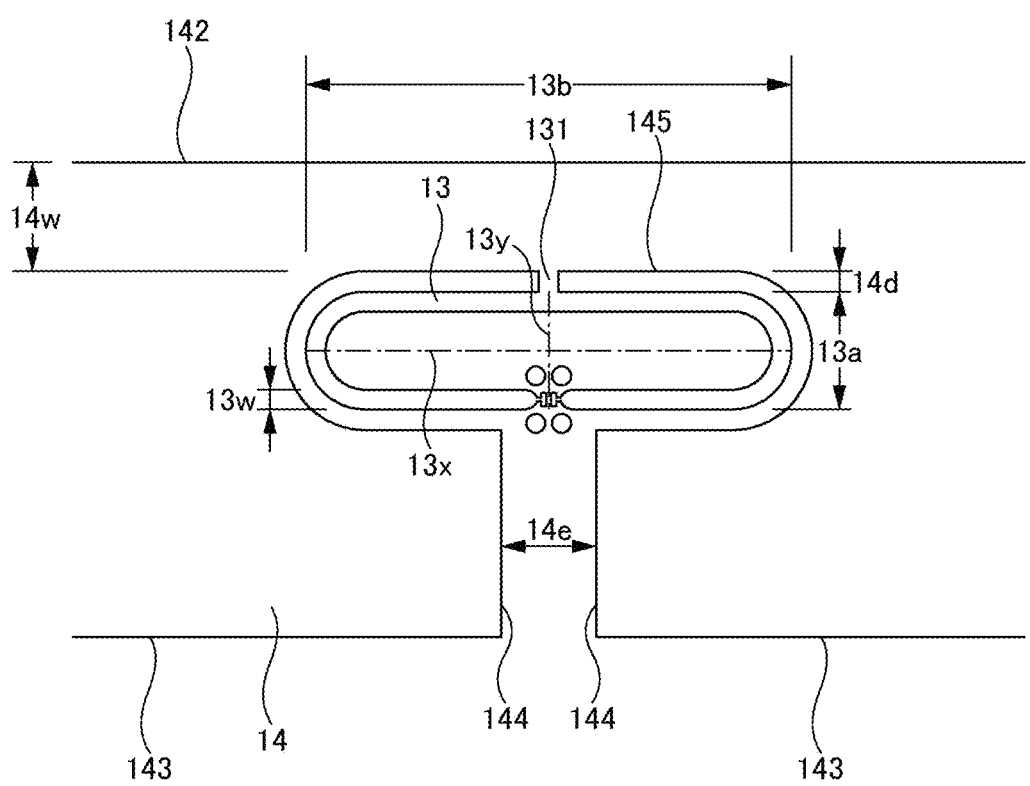
FIG. 7 is a plan view illustrating an enlarged main part of the loop conductive portion/dipole antenna portion.

In the above example, a conductive portion connecting the loop conductive portion 13 and the dipole antenna portion 14 is not provided. However, as illustrated in FIG. 7, when the loop conductive portion 13 extends through the IC chip 12 so as to have the relatively short first axis of symmetry 13y and the relatively long second axis of symmetry 13x orthogonal thereto, the dipole antenna portion 14 forms a shape having the axis of symmetry 14y overlapping the first axis of symmetry 13y, and the IC chip 12 is disposed at the one end portion of the first axis of symmetry 13y, a single connection conductive portion 131 that connects the other end portion of the first axis of symmetry 13y of the loop conductive portion 13 and the dipole antenna portion 14 may be provided. In this case, it is preferable that the connection conductive portion 131 is disposed on the opposite side from a side having the pair of tip edges 144 of the dipole antenna portion 14.

A width of the connection conductive portion 131 can be determined as appropriate, and can be within a similar range to that of the line width 13w of the loop conductive portion 13, for example. In particular, it is preferable that the width of the connection conductive portion 131 is equal to or less than the interval 14e between the pair of tip edges 144 of the dipole antenna portion 14. Other points in the case of having the connection conductive portion 131 are basically similar to those in the case of not having the connection conductive portion 131.

<Effect Confirmation Test 1—Influence of Dimensions of each Portion, etc.>

Seal label-type RFID tags for the UHF band (Samples No. 1 to 9) described below were prepared, and installed in an anechoic box in a state of being affixed to an approximate center of a glass plate (soda glass, width 100 mm×length 150 mm×thickness 10 mm) and in a state of a single unit without affixing, and tagformance made by Voyantic Ltd was used to measure a communicable distance (theoretical read range forward) in a frequency range of 700 MHz to 1300 MHz. Note that measurement test conditions not described here were basically the same.

Sample No. 1

Figure 8:
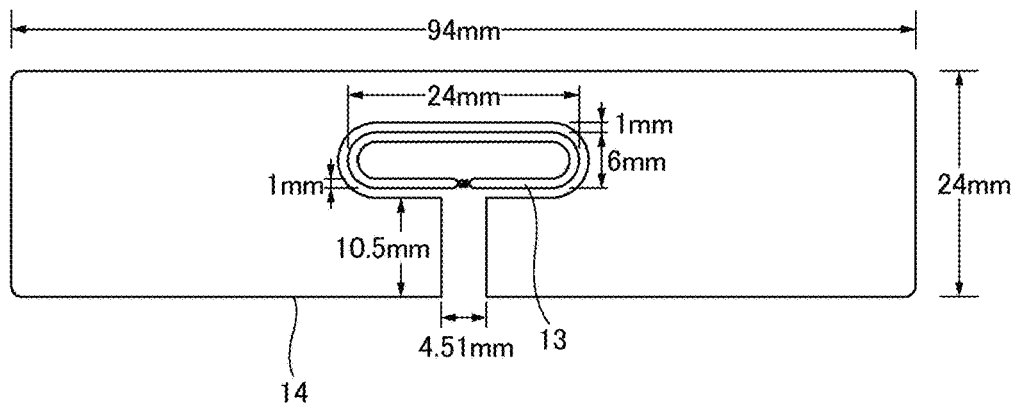
FIG. 8 is a diagram illustrating an example of a shape of a conductive portion, and a graph illustrating test results thereof.
Figure 8:
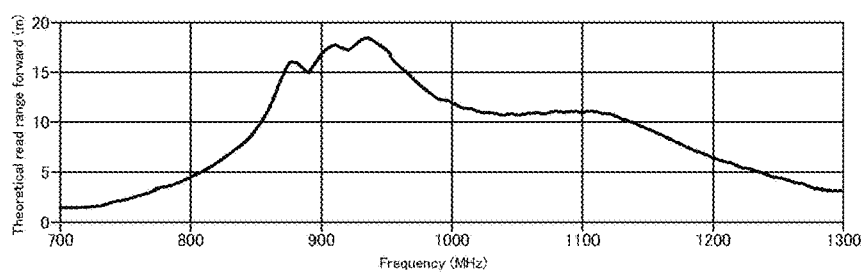
Figure 8:
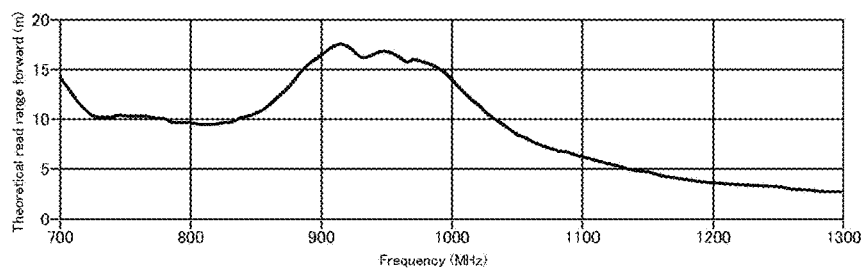

Stacked structure: similar to that of FIG. 3.
Base material 11: PET film having thickness of 38 μm.
Conductive portions 13 and 14: aluminum having thickness of 10 μm.
Shape of conductive portion: FIG. 8(a). Similar to FIGS. 1, 2, and 5.
Dimensions of dipole antenna portion 14 (width 14b× length 14a): 94 mm×24 mm.
Dimensions of loop conductive portion 13 (width 13b× length 13a): 24 mm×6 mm.
Loop area of loop conductive portion 13: 84.56 mm².
Loop outer circumference length of loop conductive portion 13: 54.84 mm.
Loop inner circumference length of loop conductive portion 13: 48.56 mm.
Width 13w of loop conductive portion 13: 1 mm.
Interval 14d between dipole antenna portion and loop conductive portion: 1 mm.
Impedance (866 MHz) of IC chip 12: 15j265 (Ω)
(915 MHz): 14j252 (Ω)
(915 MHz): 13j242 (Ω)

Sample No. 2

Figure 9:
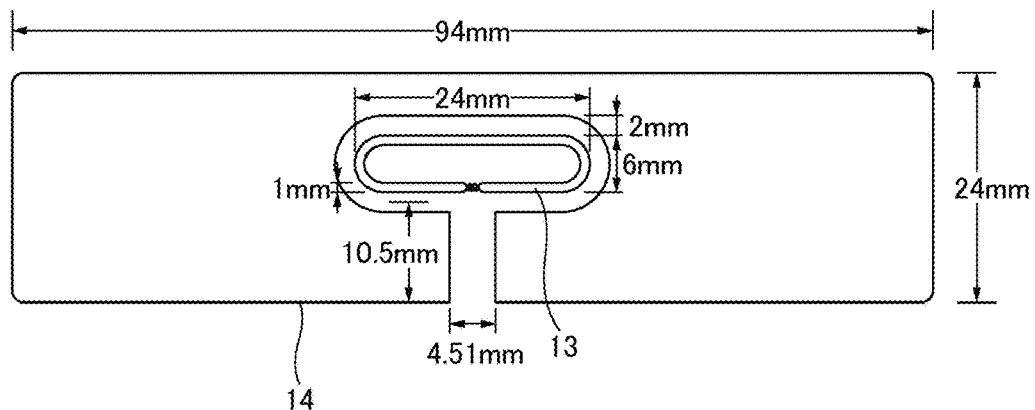
FIG. 9 is a diagram illustrating an example of a shape of the conductive portion, and a graph illustrating test results thereof.
Figure 9:
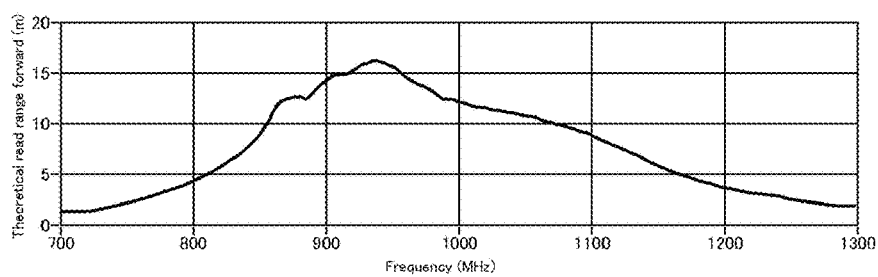
Figure 9:
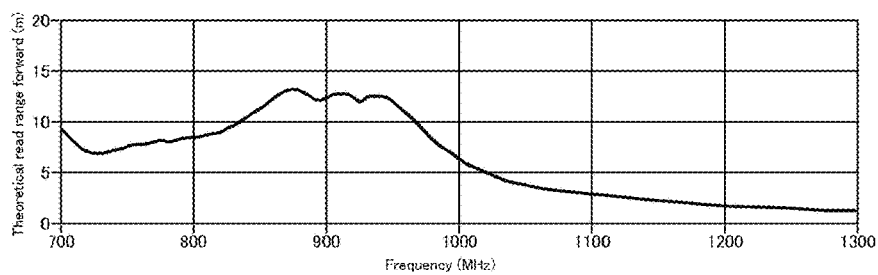

A sample similar to Sample No. 1 was adopted as Sample No. 2 except that the interval 14d between the dipole antenna portion 14 and the loop conductive portion 13 was changed to 2 mm. Shapes of the conductive portions 13 and 14 of Sample No. 2 are illustrated in FIG. 9(a).

Sample No. 3

Figure 10:
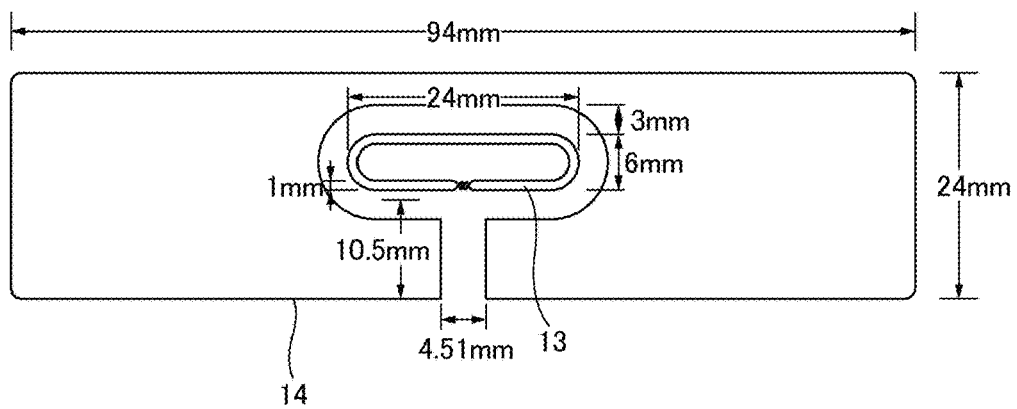
FIG. 10 is a diagram illustrating an example of a shape of the conductive portion, and a graph illustrating test results thereof.
Figure 10:
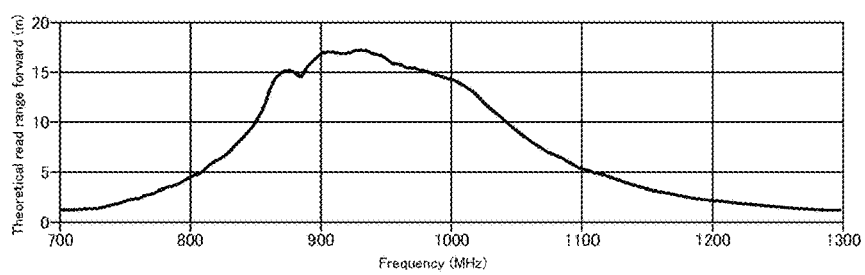
Figure 10:
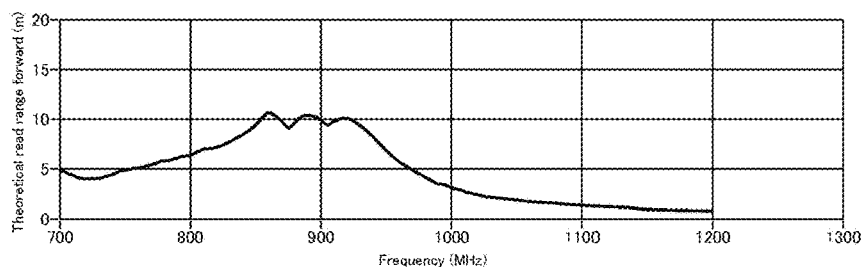

A sample similar to Sample No. 1 was adopted as Sample No. 3 except that the interval 14d between the dipole antenna portion 14 and the loop conductive portion 13 was changed to 3 mm. Shapes of the conductive portions 13 and 14 of Sample No. 3: FIG. 10(a).

Sample No. 4

Figure 11:
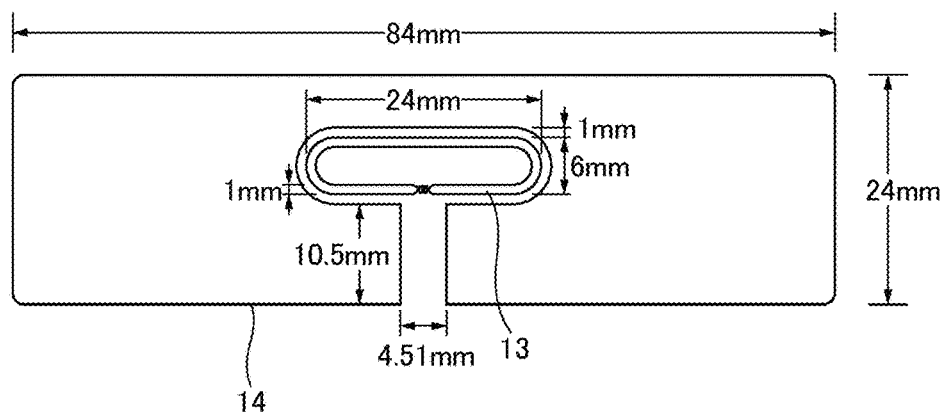
FIG. 11 is a diagram illustrating an example of a shape of the conductive portion, and a graph illustrating test results thereof.
Figure 11:
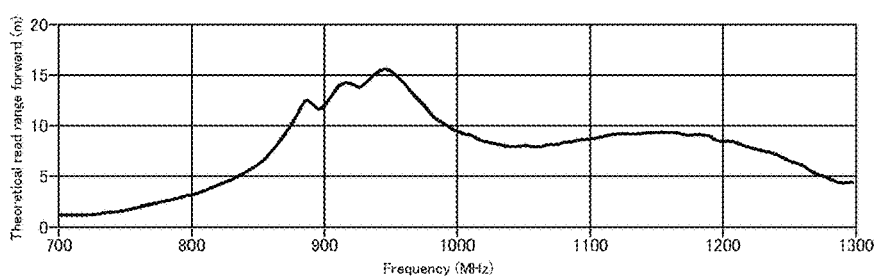
Figure 11:
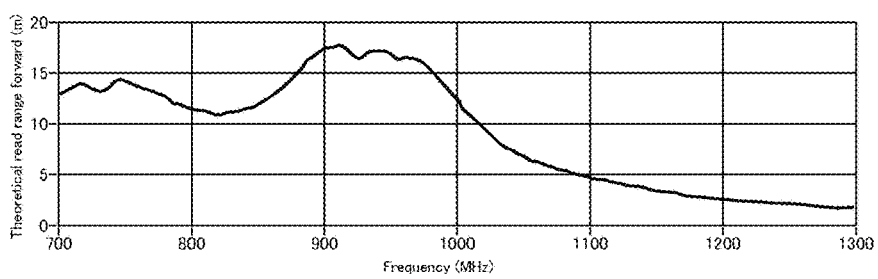

A sample similar to Sample No. 1 was adopted as Sample No. 4 except that the dimensions (width 14b×length 14a) of the dipole antenna portion 14 were changed to 84 mm×24 mm. Shapes of the conductive portions 13 and 14 of Sample No. 4 are illustrated in FIG. 11(a).

Sample No. 5

Figure 12:
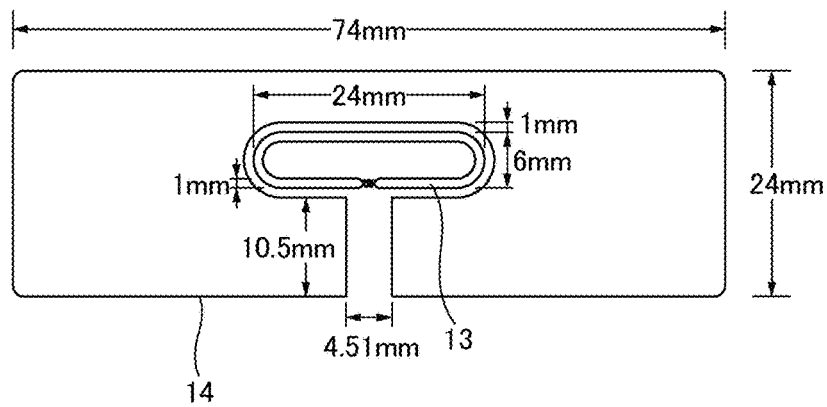
FIG. 12 is a diagram illustrating an example of a shape of the conductive portion, and a graph illustrating test results thereof.
Figure 12:
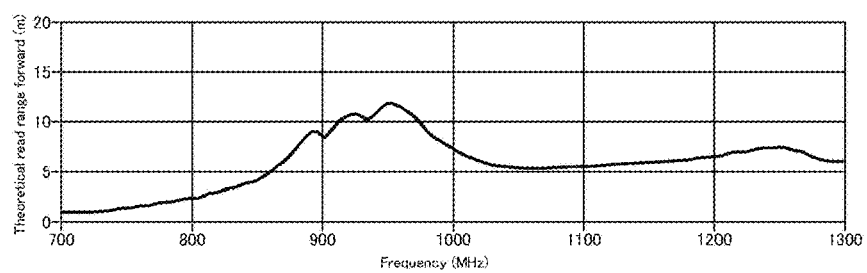
Figure 12:
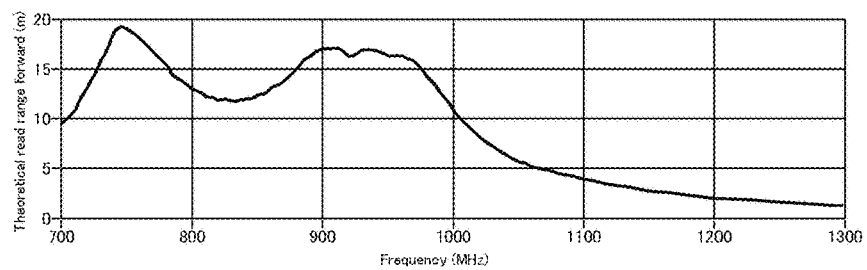

A sample similar to Sample No. 1 was adopted as Sample No. 5 except that the dimensions (width 14b×length 14a) of the dipole antenna portion 14 were changed to 74 mm×24 mm. Shapes of the conductive portions 13 and 14 of Sample No. 5 are illustrated in FIG. 12(a).

Sample No. 6

Figure 13:
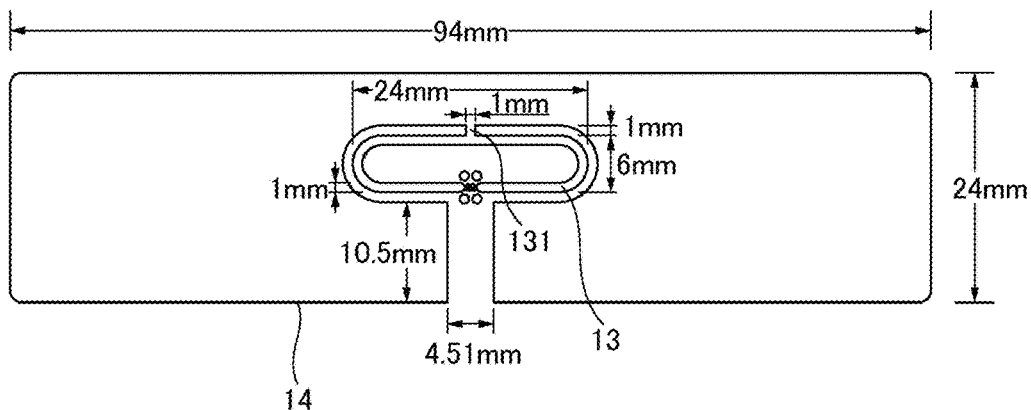
FIG. 13 is a diagram illustrating an example of a shape of the conductive portion, and a graph illustrating test results thereof.
Figure 13:
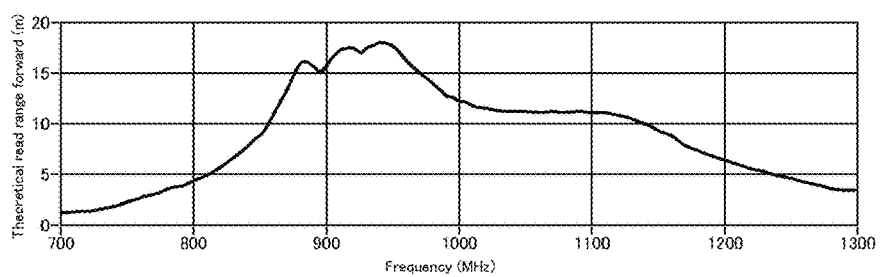
Figure 13:
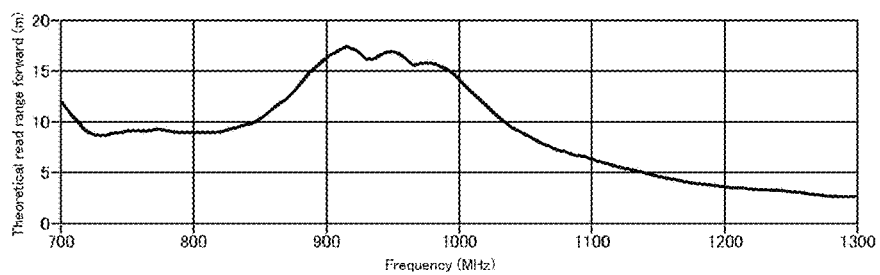

Stacked structure: similar to that of FIG. 3.
Base material 11: PET film having thickness of 38 μm.
Conductive portions 13, 14, and 131: aluminum having thickness of 10 μm.
Shapes of conductive portions 13, 14, and 131: FIG. 13(a). Similar to FIG. 7.
Dimensions of dipole antenna portion 14 (width 14b× length 14a): 94 mm×24 mm.
Dimensions of loop conductive portion 13 (width 13b× length 13a): 24 mm×6 mm.
Width 13w of loop conductive portion 13: 1 mm.
Interval 14d between dipole antenna portion and loop conductive portion: 1 mm.
Number of connection conductive portions 131: one place.
Width of connection conductive portion 131: 1 mm.

Sample No. 7

Figure 14:
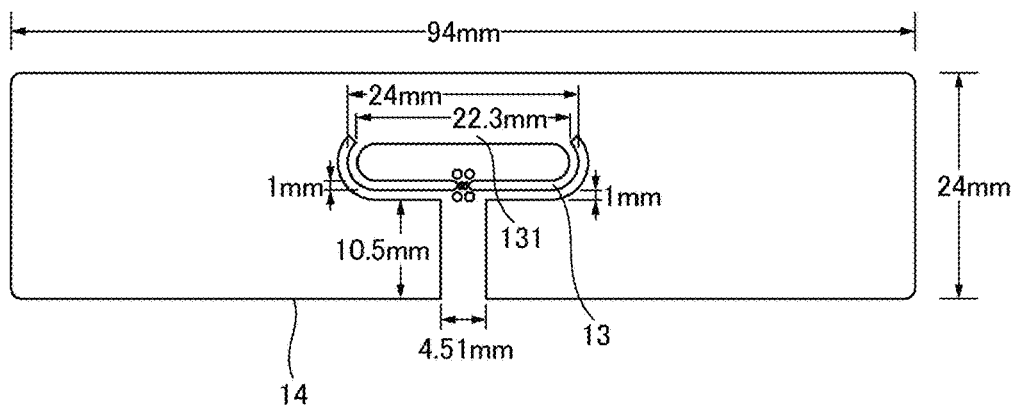
FIG. 14 is a diagram illustrating an example of a shape of the conductive portion, and a graph illustrating test results thereof.
Figure 14:
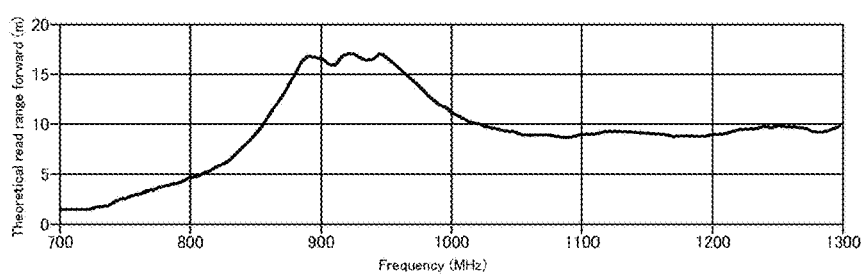
Figure 14:
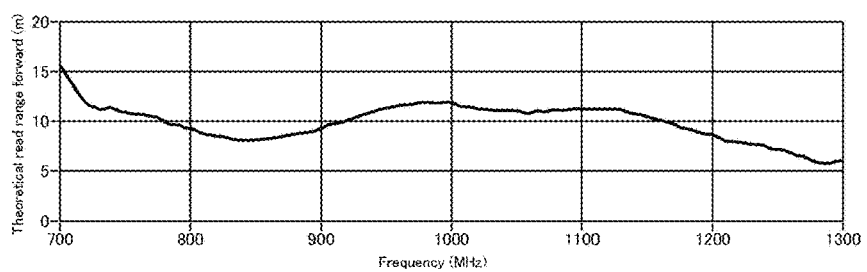

A sample similar to Sample No. 6 was adopted as Sample No. 7 except that the width of the connection conductive portion 131 was changed to 22.03 mm. Shapes of the conductive portions 13 and 14 of Sample No. 7 are illustrated in FIG. 14(a).

Sample No. 8

Figure 15:
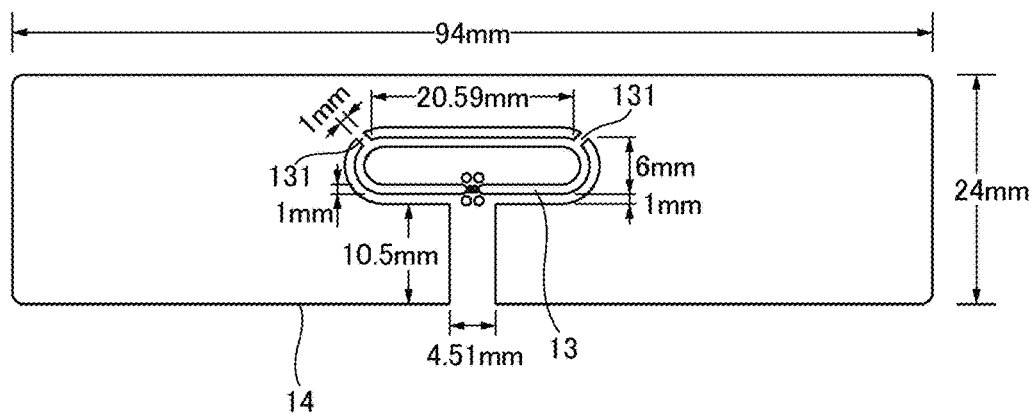
FIG. 15 is a diagram illustrating an example of a shape of the conductive portion, and a graph illustrating test results thereof.
Figure 15:
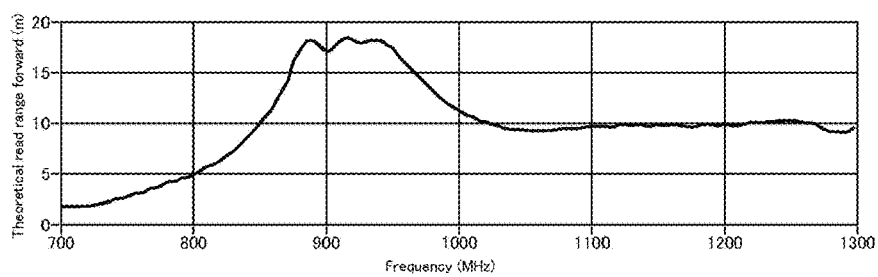
Figure 15:
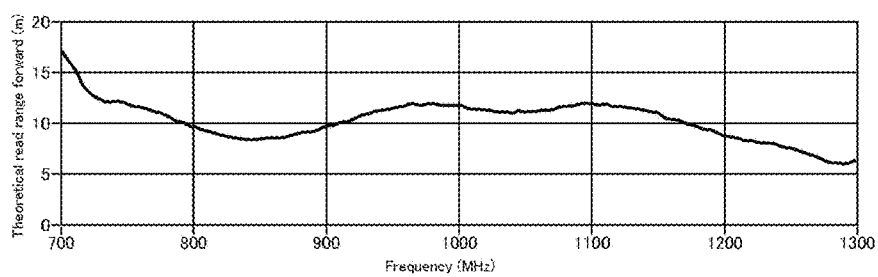

Stacked structure: similar to that of FIG. 3.
Base material 11: PET film having thickness of 38 μm.
Conductive portions 13, 14, and 131: aluminum having thickness of 10 μm.
Shapes of conductive portions 13, 14, and 131: FIG. 15(a).
Dimensions of dipole antenna portion 14 (width 14b× length 14a): 94 mm×24 mm.
Dimensions of loop conductive portion 13 (width 13b× length 13a): 24 mm×6 mm.
Width 13w of loop conductive portion 13: 1 mm.
Interval 14d between dipole antenna portion and loop conductive portion: 1 mm.
Number of connection conductive portions 131: two places symmetrically with respect to first axis of symmetry.
Interval between connection conductive portions 131 in horizontal direction: 20.59 mm.
Width of each connection conductive portion 131: 1 mm.

Sample No. 9

Figure 16:
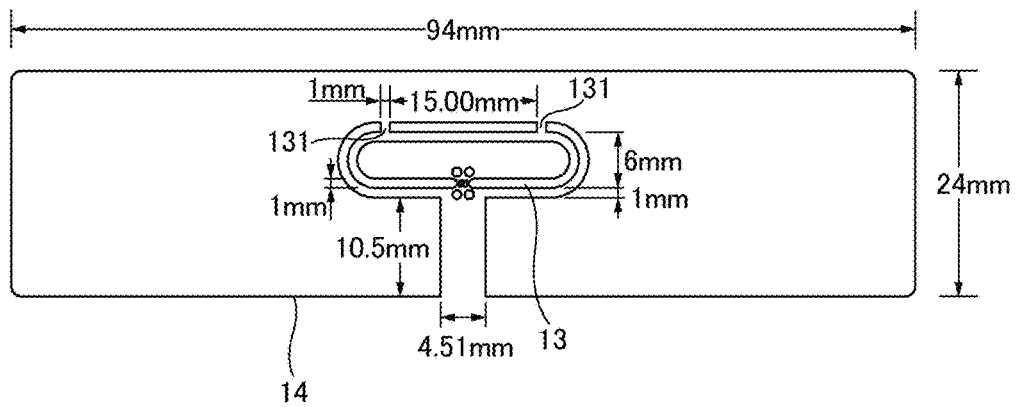
FIG. 16 is a diagram illustrating an example of a shape of the conductive portion, and a graph illustrating test results thereof.
Figure 16:
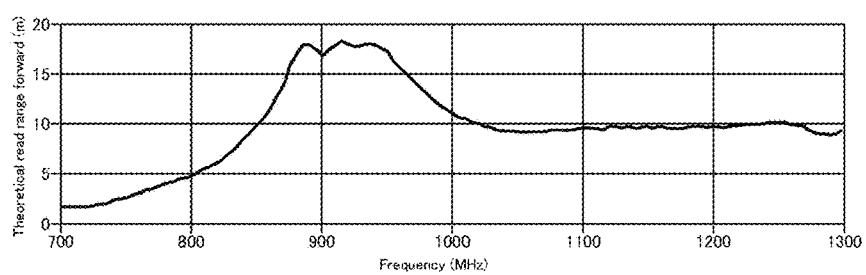
Figure 16:
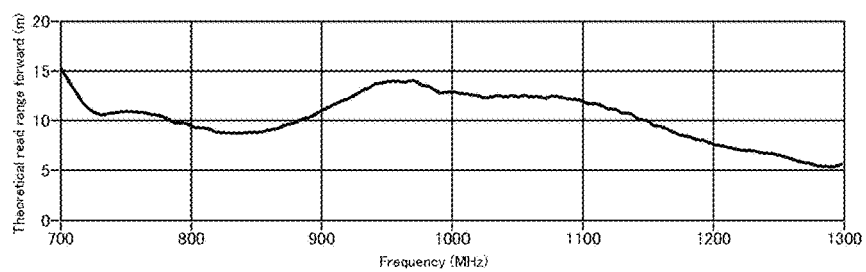

A sample similar to Sample No. 8 was adopted as Sample No. 9 except that the interval between the connection conductive portions 131 in the horizontal direction was changed to 15.00 mm. Shapes of the conductive portions 13 and 14 of Sample No. 9 are illustrated in FIG. 16(a).
(Result of Test 1)
Measurement results of sample Nos. 1 to 9 are illustrated in FIGS. 8 to 16, respectively. Note that in each figure, (a) illustrates the shapes of the conductive portions 13 and 14 of each sample, (b) illustrates a graph of a measurement result for a tag alone (not affixed to the adherend), and (c) illustrates a graph of a measurement result for a state in which the tag is affixed to a glass plate. From the measurement results, it was found that especially Sample No. 1 and Sample No. 6 are less affected by the adherend especially in a 900 MHz band including 920 MHz (dotted line position in the graph), which is a used frequency for UHF band RFID in Japan. In addition, it was found from this result that, when the interval 14d between the dipole antenna portion 14 and the loop conductive portion 13 is excessively wide, or a connection width is excessively wide in the case of providing the connection conductive portion, a preferable result cannot be obtained.
<Effect Confirmation Test 2—Comparison with Commercial Products>
Sample No. 1 described above and seal label-type RFID tags for the UHF band (Samples No. 10 and 11) described below were prepared, and installed in an anechoic box in various adherend affixing states (a. to i.) described below, and tagformance made by Voyantic Ltd was used to measure a communicable distance (theoretical read range forward) in a frequency range of 700 MHz to 1100 MHz. Note that measurement test conditions not described here were basically the same.

Sample No. 10

Figure 17:
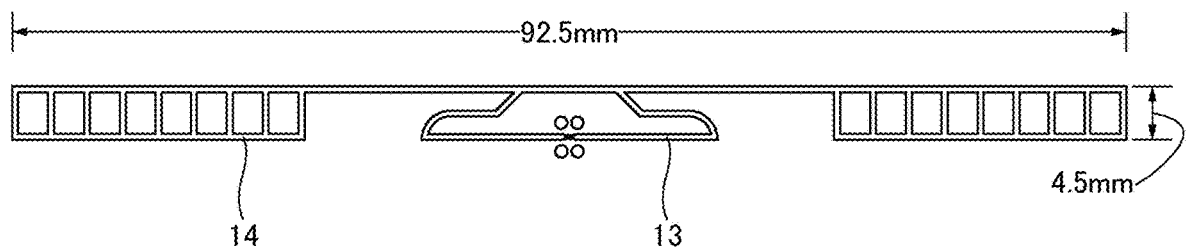
FIG. 17 is a plan view illustrating a shape of a conductive portion of a commercial product.
Figure 17:
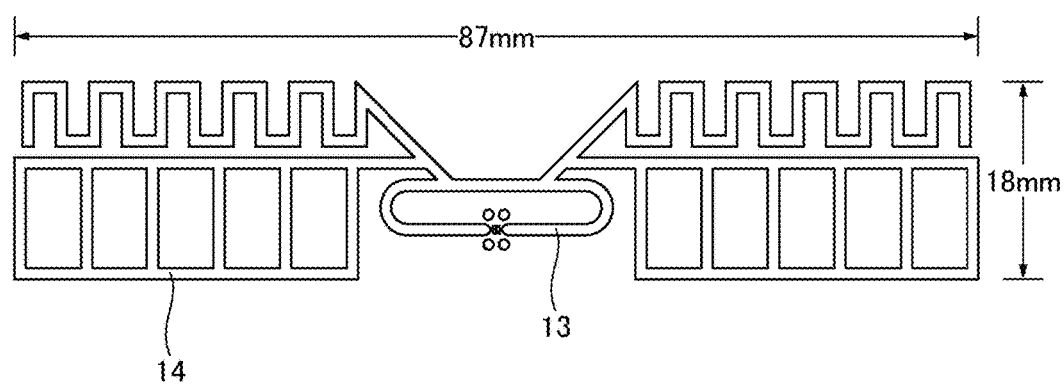

A commercially available RFID label SPMU9204 manufactured by DAIO ENGINEERING Co., ltd. was used. This RFID label corresponds to the UHF band. In the RFID label, a stacked structure is similar to that of Sample No. 1, a base material is PET, a conductive portion has a shape illustrated in FIG. 17(a), antenna dimensions were width 92.5 mm×length 4.5 mm, and label dimensions were 98.5 mm×7.5 mm.

Sample No. 11

Figure 18:
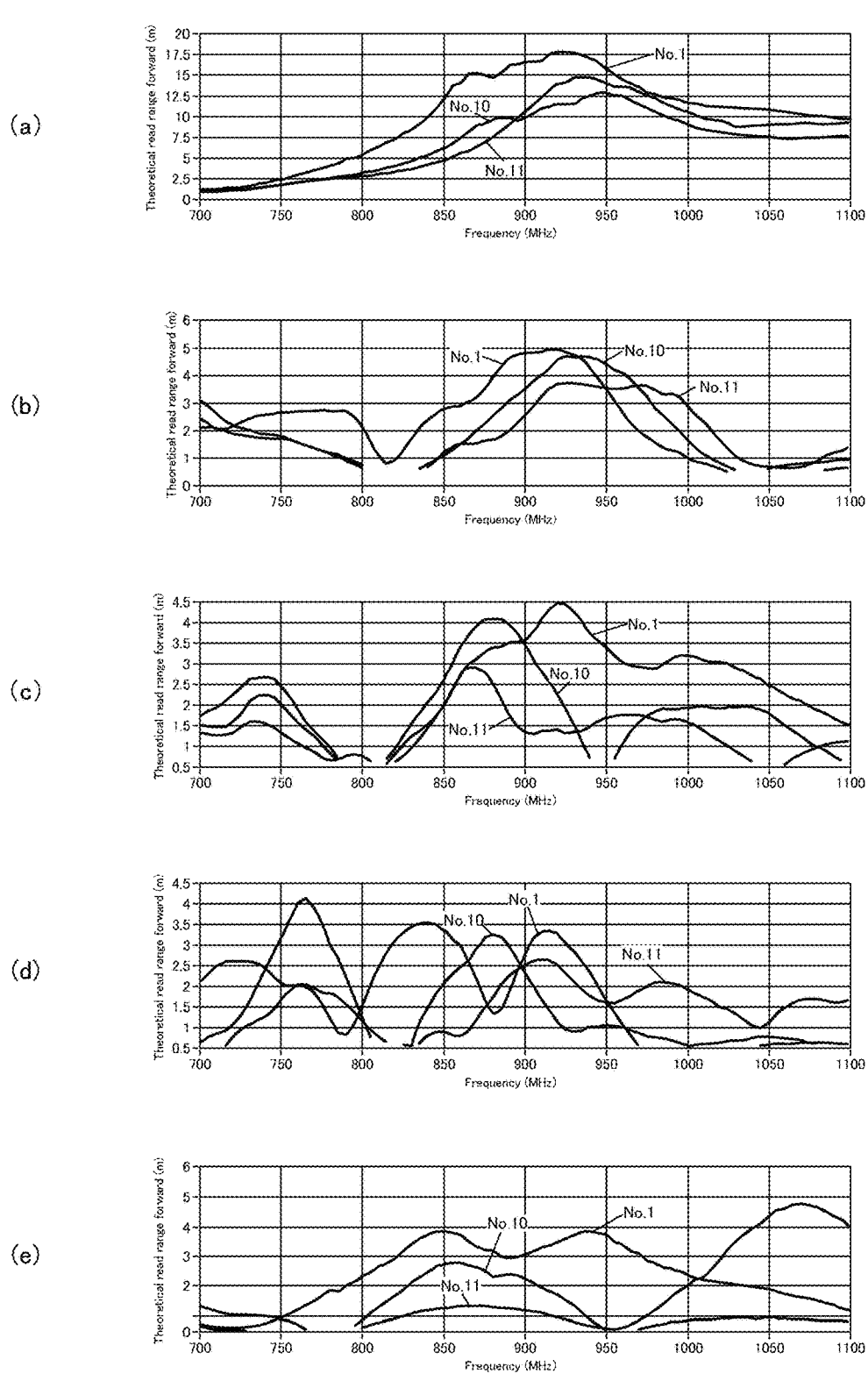
FIG. 18 is a graph illustrating test results.
Figure 19:
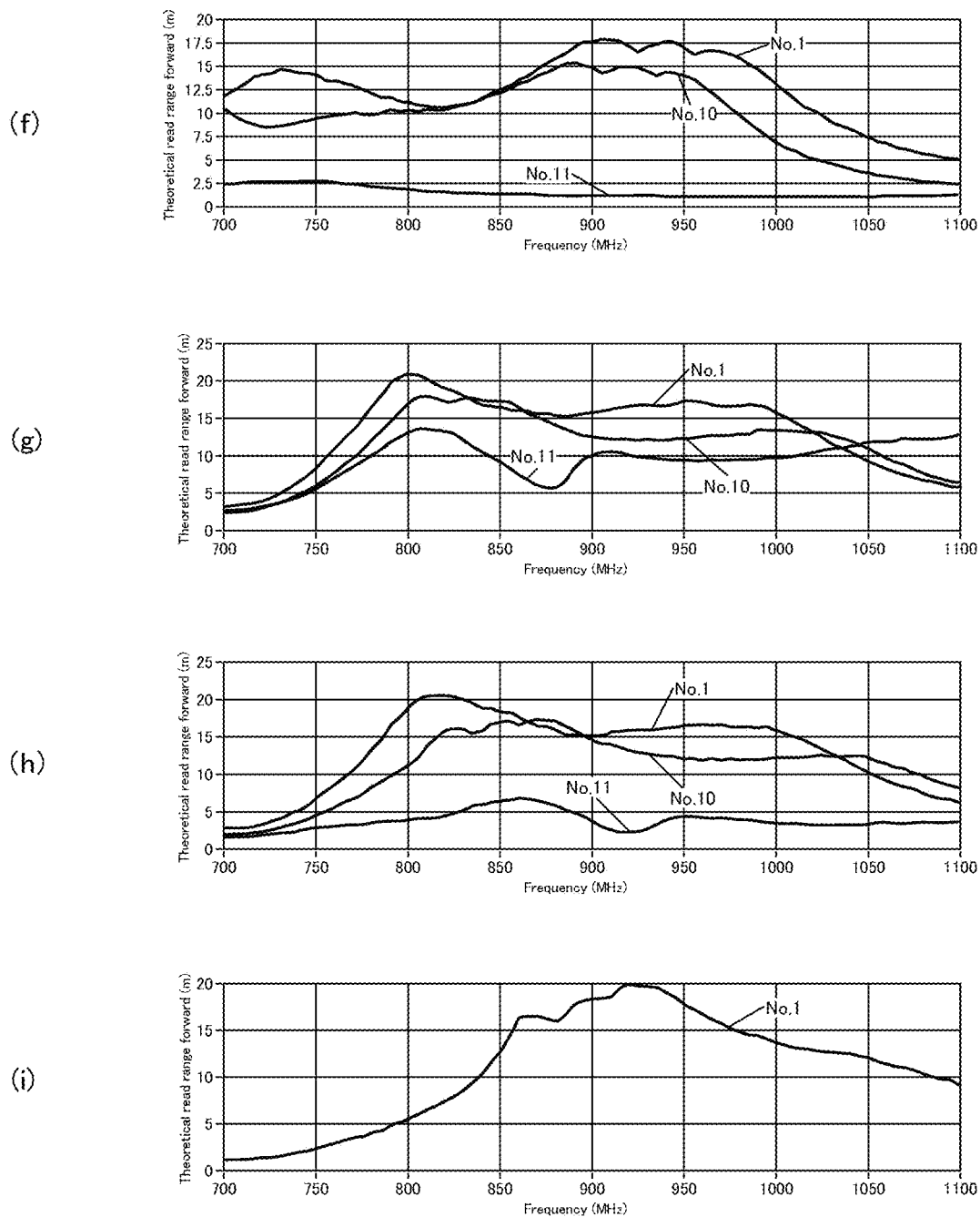
FIG. 19 is a graph illustrating test results.

A commercially available RFID label SPMU8718 manufactured by DAIO ENGINEERING Co., ltd. was used. This RFID label corresponds to the UHF band. In the RFID label, a stacked structure is similar to that of Sample No. 1, a base material is PET, a conductive portion has a shape illustrated in FIG. 17(b), antenna dimensions were width 87 mm×length 18 mm, and label dimensions were 93 mm×24 mm.
(Adherend)
  a. None (state of single tag)
  b. PET bottle containing water (500 ml type, affixing position: center of side surface in height direction)
  c. PET bottle containing water (2 liter type, affixing position: center of side surface in height direction)
  d. Drip bag containing water (1 liter type, affixing position: center of front surface)
  e. Shochu bottle 900 ml (unopened, affixing position: center of side surface in height direction)
  f. Glass plate (length 100 mm×width 150 mm×thickness 10 mm, affixing position: center)
  g. PET plate (length 100 mm×width 150 mm×thickness 10 mm, affixing position: center)
  h. PMMA plate (length 100 mm×width 150 mm×thickness 10 mm, affixing position: center)
  i. Double-sided corrugated board (length 100 mm×width 150 mm×thickness 5 mm, affixing position: center)
(Result of Test 2)
Graphs of measurement results of Sample No. 1 and Sample Nos. 10 and 11 are illustrated in FIGS. 18 and 19. Note that a graph of FIG. 18(a) is a measurement result of single tag (not affixed to the adherend) in case of above a, a graph of FIG. 18(b) is a measurement result in an affixing state to Adherent b, PET bottle 500 ml containing water, a graph of FIG. 18(c) is a measurement result in an affixing state to Adherent c, PET bottle 2 liter type containing water, a graph of FIG. 18(d) is a measurement result in an affixing state to Adherent d, drip bag containing water, and a graph of FIG. 18(e) is a measurement result in an affixing state to Adherent e, Japanese Sake bottle. In addition, a graph of FIG. 19(f) is a measurement result in an affixing state to Adherent f, glass plate, a graph of FIG. 19(g) is a measurement result in an affixing state to Adherent g, PET plate, a graph of FIG. 19(h) is a measurement result in an affixing state to Adherent h, PMMA plate, and a graph of FIG. 19(i) is a measurement result in an affixing state to Adherent i, double-sided corrugated board.
From the measurement results, it was found that especially Sample No. 1 is less affected by the adherend and has excellent properties when compared to commercial product Samples Nos. 10 and 11, especially in a 900 MHz band including 920 MHz (dotted line position in the graph), which is a used frequency for UHF band RFID in Japan.
<Effect Confirmation Test 3—Influence of Dimensions of each Portion, etc. of Dipole Antenna>
Sample No. 1 described above and a seal label-type RFID tag for the UHF band (Sample No. 12) described below were prepared, and installed in an anechoic box in the above state (f.) of affixing the glass plate, and tagformance made by Voyantic Ltd was used to measure a communicable distance (theoretical read range forward) in a frequency range of 700 MHz to 1300 MHz. In addition, for sample No. 12, the same measurement was performed in the state (a.) of the single tag. Note that measurement test conditions not described here were basically the same.

Sample No. 12

Figure 20:
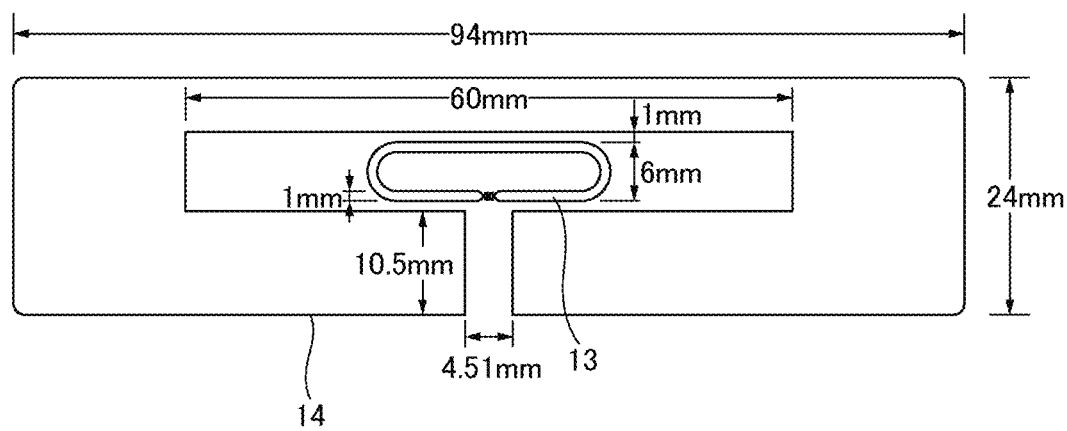
FIG. 20 is a plan view illustrating a shape example of the conductive portion.

A sample similar to Sample No. 1 was adopted as Sample No. 12 except that a dimension of the inner peripheral edge of the dipole antenna portion 14 in a direction of the second axis of symmetry was changed to 60 mm, and the interval between the dipole antenna portion 14 and the loop conductive portion 13 was varied. Shapes of the conductive portions 13 and 14 of Sample No. 12 are illustrated in FIG. 20.

Furthermore, with respect to antenna shapes of Sample Nos. 1 and 12 described above and Sample No. 13 described below, the impedance and current distribution of each antenna were evaluated using a 3D planar electromagnetic field simulator manufactured by Sonnet Software, Inc.

Sample No. 13

Figure 21:
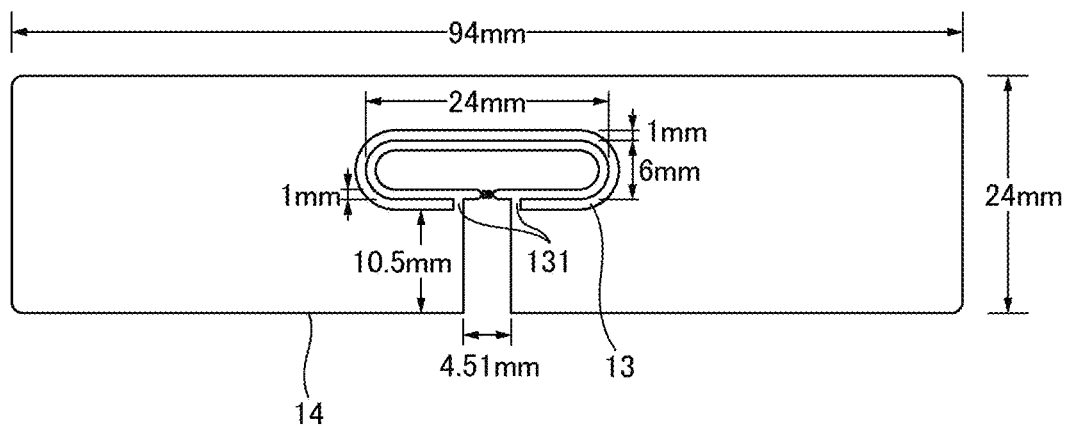
FIG. 21 is a plan view illustrating a shape example of the conductive portion.

A sample similar to Sample No. 6 was adopted as Sample No. 13 except that a pair of connection conductive portions 131 is disposed on a side having the pair of tip edges 144 of the dipole antenna portion 14. Shapes of the conductive portions 13 and 14 of Sample No. 13 are illustrated in FIG. 21.

(Result of Test 3)

Figure 22:
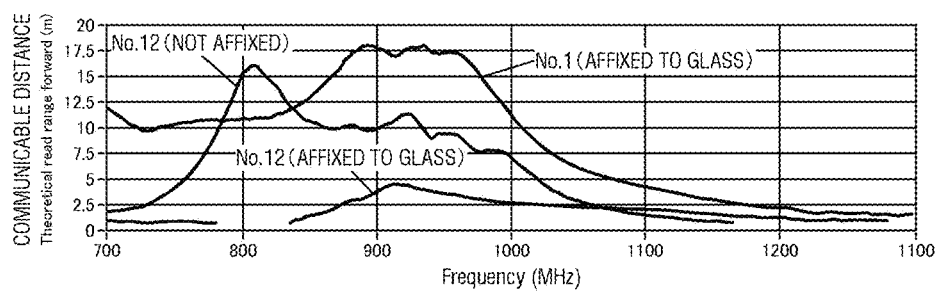
FIG. 22 is a graph illustrating test results.
Figure 23:
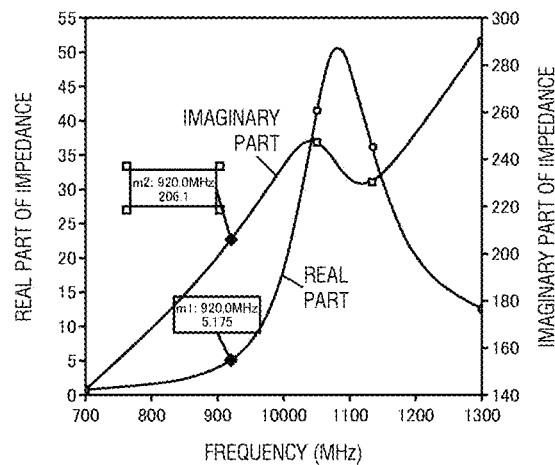
FIG. 23 is a diagram illustrating a simulation result.
Figure 23:
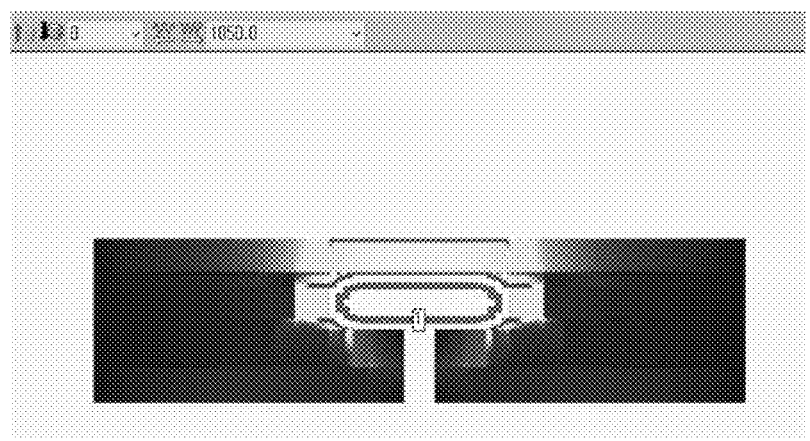
Figure 24:
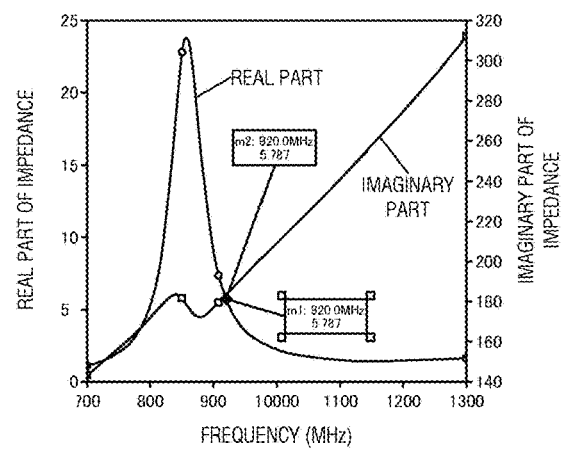
FIG. 24 is a diagram illustrating a simulation result.
Figure 24:
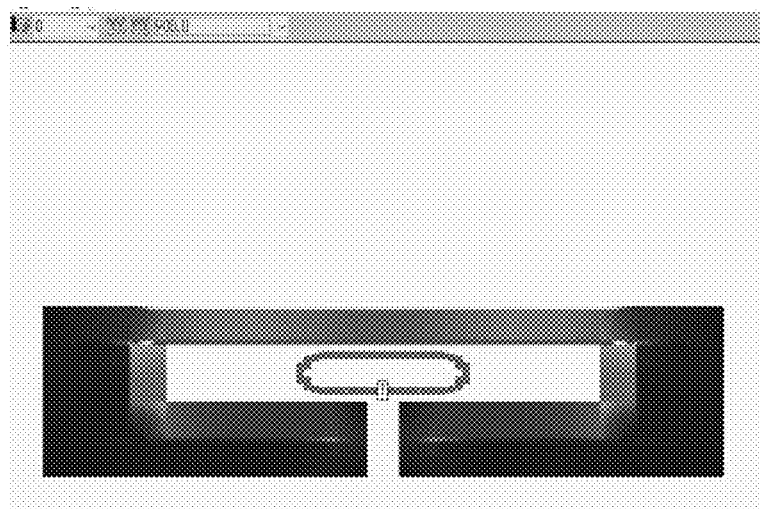
Figure 25:
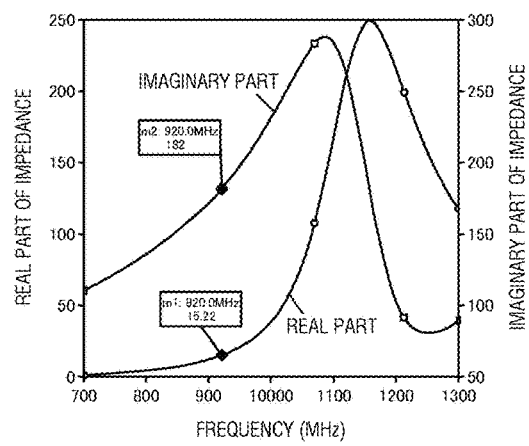
FIG. 25 is a diagram illustrating a simulation result.
Figure 25:
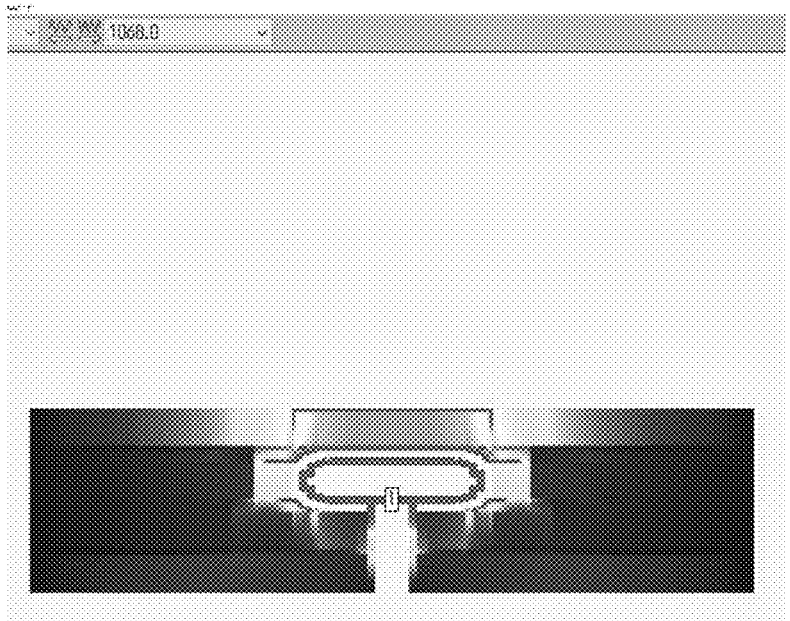

Graphs of measurement results of communicable distances of Samples No. 1 and No. 12 are illustrated in FIG. 22. Further, in a simulation result of Sample No. 1, a graph of antenna impedance is illustrated in FIG. 23($a$), and a current distribution diagram is illustrated in FIG. 23($b$). Similarly, in a simulation result of Sample No. 12, a graph of antenna impedance is illustrated in FIG. 24($a$), and a current distribution diagram is illustrated in FIG. 24($b$). Similarly, in a simulation result of Sample No. 13, a graph of antenna impedance is illustrated in FIG. 25($a$), and a current distribution diagram is illustrated in FIG. 25($b$). Note that current distributions illustrated in FIGS. 24($a$) and 25($b$) are based on color display, and in a region corresponding to the dipole antenna portion, as a current distribution becomes lower, generally darker color is displayed.

It was found from results illustrated in FIGS. 22 to 24 that, when the interval between the dipole antenna portion 14 and the loop conductive portion 13 is not constant, a current distribution of the dipole antenna portion 14 is lowered, and a resonance frequency is shifted to a low frequency side to decrease a communicable distance in a state of affixing the glass. In particular, from the result of FIG. 22, it was presumed that when the area of the dipole antenna portion 14 becomes small, an influence of the adherend is likely to increase. In addition, it can be understood that, when frequency characteristics of the impedance of the entire antenna (the loop conductive portion 13 and the dipole antenna portion 14) are designed to match frequency characteristics of the impedance of the IC chip 12, attenuation of power is be reduced, and a communication distance is extended. Furthermore, it was found from the results illustrated in FIGS. 23 and 25 that, when the connection conductive portion 131 is disposed on the side having the pair of tip edges 144 of the dipole antenna portion 14, a resonance frequency shifts to the high frequency side. From the above description, it was found to be particularly preferable when the dipole antenna portion 14 surrounds the loop conductive portion 13 at a certain interval, and the connection conductive portion 131 is disposed on the opposite side from the side having the pair of tip edges 144 of the dipole antenna portion 14.

INDUSTRIAL APPLICABILITY

The present invention is applicable to RFID tags in general. In other words, the present invention is suitable for a passive type (battery-free type) that uses electromagnetic waves received from a reader/writer as a drive power supply, and is also applicable to an active type (battery-mounted type) that incorporates a power source and a transmission circuit. In addition, the present invention is applicable not only to a label type (including both a seal type having a pressure sensitive adhesive layer on a back surface and a type having no pressure sensitive adhesive layer), but also various forms of RFID tags of a card type, a wristband type, etc.

REFERENCE SIGNS LIST

10 RFID tag
11 Base material
12 IC chip
13, 14 Conductive portion
15 Inlay
16 Pressure sensitive adhesive layer
17 Peel sheet
18 Paper layer
19 Adhesive layer
13 Loop conductive portion
13$y$ First axis of symmetry
13$x$ Second axis of symmetry
14 Dipole antenna portion
Connection conductive portion 131
141 to 143 Outer peripheral edge
141 First edge portion
142 Second edge portion
143 Third edge portion
144 Tip edge
145 Inner peripheral edge

The invention claimed is:
1. An RFID tag comprising:
a base material having a main surface; and
an inlay provided with an IC chip and an antenna on the base material,
wherein:
the antenna includes a loop conductive portion having both end portions connected to the IC chip so as to form a loop shape through the IC chip, and a dipole antenna portion disposed to surround the loop conductive portion with an interval allowing inductive coupling;
the loop conductive portion extends through the IC chip to form an oval shape or a substantially rectangular shape having a relatively short first axis of symmetry and a relatively long second axis of symmetry orthogonal thereto;
the IC chip is disposed at one end portion of the first axis of symmetry; and
the loop conductive portion and the dipole antenna portion are formed on the main surface to have a same thickness, and the IC chip is disposed on the both end portions of the loop conductive portion, characterized in that:

the dipole antenna portion is disposed to substantially surround the loop conductive portion at a certain interval; and the dipole antenna portion has an axis of symmetry overlapping the first axis of symmetry, terminates at a pair of tip edges facing and spaced apart from each other with a virtual line obtained by extending an IC chip side of the first axis of symmetry interposed therebetween, and continues so as to wrap around the loop conductive portion from one side to the other side of each of the tip edges.

2. The RFID tag according to claim 1, wherein the loop conductive portion has a dimension at which a resonance circuit configured together with the IC chip is tuned to a used frequency.

3. A method of manufacturing the RFID tag according to claim 1, the method comprising:

forming the loop conductive portion and the dipole antenna portion on the base material by etching or printing; and mounting the IC chip on the loop conductive portion.

4. The RFID tag according to claim 1, wherein:

the dipole antenna portion has an inner peripheral edge continuous along an outer peripheral edge of the loop conductive portion, outer peripheral edges, and the pair of tip edges connecting both ends of the inner peripheral edge and both ends of each of the outer peripheral edges;

the outer peripheral edges have a pair of first edge portions extending parallel to the first axis of symmetry, a second edge portion extending parallel to the second axis of symmetry and connecting one end of one of the first edge portions and one end of the other one of the first edge portions, and a third edge portion connecting ends of the pair of tip edges on an opposite side from a second edge portion side and the other end of each of the first edge portions; and a sum of a dimension of the pair of first edge portions in a direction along the first axis of symmetry, a dimension of the second edge portion in a direction along the second axis of symmetry, and a dimension of the pair of tip edges in the direction along the first axis of symmetry is equal to ½ wavelength of a used frequency.

5. An RFID tag comprising:

a base material having a main surface; and an inlay provided with an IC chip and an antenna on the base material, wherein:

the antenna includes a loop conductive portion having both end portions connected to the IC chip so as to form a loop shape through the IC chip, and a dipole antenna portion disposed to surround the loop conductive portion with an interval;

the loop conductive portion extends through the IC chip to form an oval shape or a substantially rectangular shape having a relatively short first axis of symmetry and a relatively long second axis of symmetry orthogonal thereto;

the IC chip is disposed at one end portion of the first axis of symmetry;

a single connection conductive portion is provided to connect the other end portion of the first axis of symmetry of the loop conductive portion and the dipole antenna portion to each other; and the loop conductive portion, the connection conductive portion, and the dipole antenna portion are formed on the main surface so as to have a same thickness, and the IC chip is disposed on both end portions of the loop conductive portion; characterized in that:

the dipole antenna portion is disposed to substantially surround the loop conductive portion at a certain interval; and the dipole antenna portion has an axis of symmetry overlapping the first axis of symmetry, terminates at a pair of tip edges facing and spaced apart from each other with a virtual line obtained by extending an IC chip side of the first axis of symmetry interposed therebetween, and continues so as to wrap around the loop conductive portion from one side to the other side of each of the tip edges.

6. The RFID tag according to claim 5, wherein:

the dipole antenna portion has an inner peripheral edge continuous along an outer peripheral edge of the loop conductive portion, outer peripheral edges, and the pair of tip edges connecting both ends of the inner peripheral edge and both ends of each of the outer peripheral edges;

the outer peripheral edges have a pair of first edge portions extending parallel to the first axis of symmetry, a second edge portion extending parallel to the second axis of symmetry and connecting one end of one of the first edge portions and one end of the other one of the first edge portions, and a third edge portion connecting ends of the pair of tip edges on an opposite side from a second edge portion side and the other end of each of the first edge portions; and a sum of a dimension of the pair of first edge portions in a direction along the first axis of symmetry, a dimension of the second edge portion in a direction along the second axis of symmetry, and a dimension of the pair of tip edges in the direction along the first axis of symmetry is equal to ½ wavelength of a used frequency.

7. The RFID tag according to claim 6, wherein the used frequency is in a UHF band.

8. The RFID tag according to claim 1, wherein the RFID tag is an RFID label having a pressure sensitive adhesive layer on a back surface.

9. The RFID tag according to claim 6, wherein the RFID tag is an RFID label having a pressure sensitive adhesive layer on a back surface.

10. The RFID tag according to claim 7, wherein the RFID tag is an RFID label having a pressure sensitive adhesive layer on a back surface.

11. The RFID tag according to claim 5, wherein the loop conductive portion has a dimension at which a resonance circuit configured together with the IC chip is tuned to a used frequency.

12. The RFID tag according to claim 1, wherein the loop conductive portion has a dimension at which a resonance circuit configured together with the IC chip is tuned to a used frequency.

13. The RFID tag according to claim 6, wherein the loop conductive portion has a dimension at which a resonance circuit configured together with the IC chip is tuned to a used frequency.

14. The RFID tag according to claim 7, wherein the loop conductive portion has a dimension at which a resonance circuit configured together with the IC chip is tuned to a used frequency.

15. The RFID tag according to claim 8, wherein
the loop conductive portion has a dimension at which a resonance circuit configured together with the IC chip is tuned to a used frequency.

16. A method of manufacturing the RFID tag according to claim 5, the method comprising:
forming the loop conductive portion and the dipole antenna portion on the base material by etching or printing; and
mounting the IC chip on the loop conductive portion.

* * * * *